（12） United States Patent
Wachter et al.

(10) Patent No.: US 8,699,460 B2
(45) Date of Patent: Apr. 15, 2014

(54) POSITION LOCATION CALL FLOW

(75) Inventors: Andreas K. Wachter, San Carlos, CA (US); Stephen William Edge, Escondido, CA (US); Ie-Hong Lin, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 13/081,396

(22) Filed: Apr. 6, 2011

(65) Prior Publication Data

US 2011/0249623 A1  Oct. 13, 2011

Related U.S. Application Data

(60) Provisional application No. 61/322,823, filed on Apr. 10, 2010, provisional application No. 61/323,692, filed on Apr. 13, 2010, provisional application No. 61/328,017, filed on Apr. 26, 2010.

(51) Int. Cl.
*H04W 4/00* (2009.01)

(52) U.S. Cl.
USPC ............................................. 370/331

(58) Field of Classification Search
None
See application file for complete search history.

(56) References Cited

U.S. PATENT DOCUMENTS 7,822,425 B2   10/2010 Shim et al.
2007/0182547 A1  8/2007 Wachter et al.
2008/0045237 A1* 2/2008 Yan .............................. 455/456.1
2009/0083430 A1* 3/2009 Edge et al. .................... 709/228
2009/0181698 A1* 7/2009 Farmer et al. .............. 455/456.3
2009/0216846 A1   8/2009 Burroughs et al.
2010/0093369 A1   4/2010 Shim

FOREIGN PATENT DOCUMENTS

WO       2007083200 A1    7/2007

OTHER PUBLICATIONS

International Search Report and Written Opinion—PCT/US2011/031812—ISA/EPO—Oct. 20, 2011.
European Search Report—EP1302005—Search Authority—The Hague—Sep. 9, 2013.
Taiwan Search Report—TW100112477—TIPO—Aug. 13, 2013.

* cited by examiner

*Primary Examiner* — Raj Jain
(74) *Attorney, Agent, or Firm* — Arnold J. Gum

(57) ABSTRACT

Techniques for initiating and, if desired, modifying location services for Secure User Plane Location (SUPL) and other location architectures are described. To initiate SUPL service, a SUPL Location Platform (SLP) transmits a SUPL initial session message applicable to any service request to a SUPL enabled terminal (SET) and receives in response the service capabilities of the SET. The SLP selects and requests service from the SET consistent with the service capabilities of the SET. The SET may initiate SUPL service by requesting the service capabilities of the SLP. The SET selects and requests service from the SLP that is consistent with the service capabilities received from the SLP. The SET and SLP communicate to determine a position estimate for the SET. The service may be modified before or while communicating between the SET and the SLP to determine a position estimate for the SET.

47 Claims, 11 Drawing Sheets

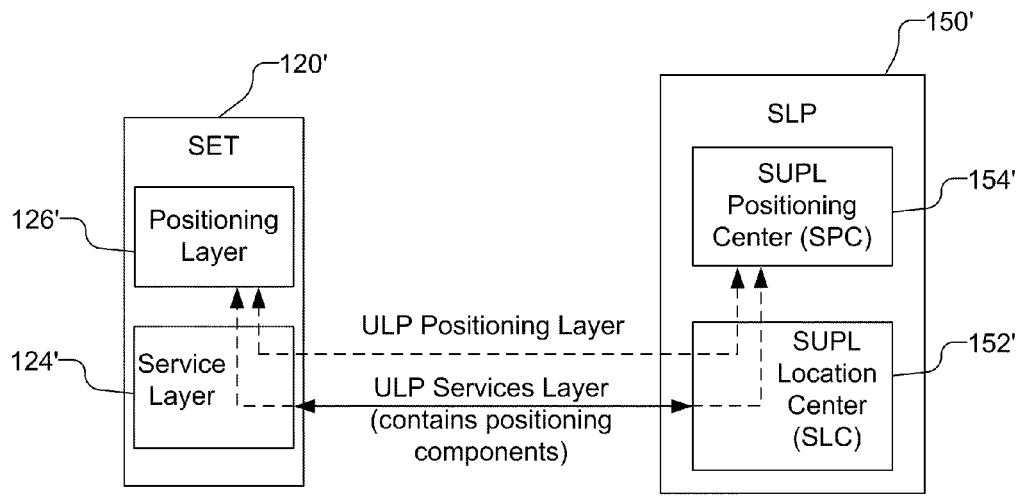
Fig. 4
(Conventional)

POSITION LOCATION CALL FLOW

CROSS-REFERENCE TO RELATED APPLICATION(S)

This application claims priority under 35 USC 119 to U.S. Provisional Application No. 61/322,823, filed Apr. 10, 2010 and entitled "SUPL 3.0 Concept, Procedures and Message Flows"; U.S. Provisional Application No. 61/323,692, filed Apr. 13, 2010 and entitled "SUPL 3.0 Concept, Procedures and Message Flows"; and U.S. Provisional Application No. 61/328,017, filed Apr. 26, 2010 and entitled "SUPL 3.0 Concept, Procedures and Message Flows", all of which are assigned to the assignee hereof and all of which are incorporated herein by reference.

BACKGROUND

It is often desirable, and sometimes necessary, to know the location or position of a wireless device in a network. The terms "location" and "position" are synonymous and are used interchangeably herein. For example, a user may utilize the wireless device to browse through a website and may click on location sensitive content. A web server may then query the network for the position of the wireless device. The network may initiate position processing with the wireless device in order to ascertain the position of the wireless device. The network may then return a position estimate for the wireless device to the web server, which may use this position estimate to provide appropriate content to the user. There are many other scenarios in which knowledge of the position of the wireless device is useful or necessary.

A message flow (which may also be called a call flow or a procedure) is typically executed in order to obtain a position estimate for the wireless device and to send this position estimate to a client entity, e.g., the web server. Various messages are typically exchanged between one or more network entities, the wireless device, and the client entity for the message flow. These messages ensure that each entity is provided with pertinent information, or can obtain this information from another entity, in order to carry out positioning for the wireless device and/or to deliver the position estimate to the client entity. However, these messages add to the traffic among the various network entities. The additional traffic may be especially great for location services in which a position estimate for the wireless device is periodically provided to the client entity. The messages may also extend the response time for sending the position estimate to the client entity. Furthermore, different types of location service (e.g. provision of a single location estimate, provision of a location estimate at fixed periodic intervals, provision of a location estimate whenever some trigger condition is encountered) may be associated with different types of message flow which may add cost and complexity to the support of multiple types of location service.

One commonly used protocol for location based services is known as Secure User Plane Location (SUPL) 2.0. In the SUPL 2.0 protocol, assistance and positioning data is sent over the user's traffic channel using a secure connection between the SUPL enabled Terminal (SET) and the SUPL Location Platform (SLP) on the network side. While SUPL 2.0 is a secure means to efficiently provide location based services, improvements are desirable.

SUMMARY

Techniques for initiating and, if desired, modifying location services for Secure User Plane Location (SUPL) and other location architectures are described. To initiate SUPL service, a SUPL Location Platform (SLP) transmits a SUPL initial session message applicable to any service request to a SUPL enabled terminal (SET) and receives in response the service capabilities of the SET. The SLP selects and requests service from the SET consistent with the service capabilities of the SET. The SET may initiate SUPL service by requesting the service capabilities of the SLP. The SET selects and requests service from the SLP that is consistent with the service capabilities received from the SLP. The SET and SLP communicate to determine a position estimate for the SET. The service may be modified before or while communicating between the SET and the SLP to determine a position estimate for the SET.

In an embodiment, an apparatus includes at least one processor configured to receive from a Secure User Plane Location (SUPL) agent a request for at least one position estimate for a SUPL enabled terminal (SET), transmit to the SET a SUPL initial session message applicable to any service request. The processor is configured to receive from the SET service capabilities of the SET and to select and request service from the SET that is consistent with the service capabilities of the SET. The processor is further configured to communicate with the SET to determine at least one position estimate for the SET, and send the position estimate to the SUPL agent. In one aspect, no positioning parameters may be provided prior to requesting service from the SET. The processor may be configured to receive from the SET a service modification request with service parameters that are modified with respect to the service requested from the SET.

In another embodiment, a method includes receiving from a Secure User Plane Location (SUPL) agent a request for at least one position estimate for a SUPL enabled terminal (SET) and transmitting to the SET a SUPL initial session message applicable to any service request. The method includes receiving from the SET service capabilities of the SET and selecting and requesting service from the SET that is consistent with the service capabilities of the SET. The method further includes communicating with the SET to determine at least one position estimate for the SET; and sending the position estimate to the SUPL agent. In one aspect, no positioning parameters may be provided prior to requesting service from the SET. The method may further include receiving from the SET a service modification request with service parameters that are modified with respect to the service requested from the SET.

In another embodiment, a system includes means for receiving from a Secure User Plane Location (SUPL) agent a request for at least one position estimate for a SUPL enabled terminal (SET) and means for transmitting to the SET a SUPL initial session message applicable to any service request. The system may further include means for receiving from the SET service capabilities of the SET and means for selecting and requesting service from the SET that is consistent with the service capabilities of the SET. The system further includes means for communicating with the SET to determine at least one position estimate for the SET; and means for sending the position estimate to the SUPL agent. In one aspect no positioning parameters are provided prior to requesting service from the SET. The system may further include means for means for receiving from the SET a service modification request with service parameters that are modified with respect to the service requested from the SET.

In yet another embodiment, a computer-readable medium including program code stored thereon includes program code to receive from a Secure User Plane Location (SUPL) agent a request for at least one position estimate for a SUPL enabled terminal (SET) and program code to transmit to the SET a SUPL initial session message applicable to any service request. The computer-readable medium further includes program code to receive from the SET service capabilities of the SET and program code to select and request service from the SET that is consistent with the service capabilities of the SET. The computer-readable medium further includes program code to communicate with the SET to determine at least one position estimate for the SET; and program code to send the position estimate to the SUPL agent. In one aspect no positioning parameters are provided prior to requesting service from the SET. The computer-readable medium may further include program code to receive from the SET a service modification request with service parameters that are modified with respect to the service requested from the SET.

In another embodiment, an apparatus includes at least one processor configured to receive a request from a Secure User Plane Location (SUPL) agent for at least one position estimate for a SUPL enabled terminal (SET) and to determine service capabilities of a SUPL Location Platform (SLP). The at least one process may be configured to request from the SLP the service capabilities of the SLP and to receive from the SLP the service capabilities or to use information from a previous session with the SLP to determine service capabilities of the SLP. The process is further configured to select and request service from the SLP that is consistent with the service capabilities of the SLP. The process is further configured to communicate with the SLP to determine at least one position estimate for the SET; and communicate with the SLP to provide to the SUPL agent at least one position estimate for the SET. In one aspect, no positioning parameters are provided prior to requesting service from the SLP. The process may be further configured to receive from the SLP a service modification request with service parameters that are modified with respect to the service requested from the SLP.

In another embodiment, a method includes receiving a request from a Secure User Plane Location (SUPL) agent for at least one position estimate for a SUPL enabled terminal (SET) and determining service capabilities of a SUPL Location Platform (SLP). The service capabilities may be determined by requesting from the SLP the service capabilities of the SLP and receiving from the SLP the service capabilities or using information from a previous session with the SLP. The method further includes receiving from the SLP the service capabilities of the SLP and selecting and requesting service from the SLP that is consistent with the service capabilities of the SLP. The method further includes communicating with the SLP to determine at least one position estimate for the SET; and communicating with the SLP to provide to the SUPL agent at least one position estimate for the SET. In one aspect, no positioning parameters are provided prior to requesting service from the SLP. The method may further include receiving from the SLP a service modification request with service parameters that are modified with respect to the service requested from the SLP.

In another embodiment, a system includes means for receiving a request from a Secure User Plane Location (SUPL) agent for at least one position estimate for a SUPL enabled terminal (SET), and means for determining service capabilities of a SUPL Location Platform (SLP). The system further includes means for requesting service from the SLP that is consistent with the service capabilities of the SLP. The system further includes means for communicating with the SLP to determine at least one position estimate for the SET; and means for communicating with the SLP to provide to the SUPL agent at least one position estimate for the SET. In one aspect, no positioning parameters are provided prior to requesting service from the SLP. The system may further include means for receiving from the SLP a service modification request with service parameters that are modified with respect to the service requested from the SLP.

In yet another embodiment, a computer-readable medium including program code stored thereon includes program code to receive a request from a Secure User Plane Location (SUPL) agent for at least one position estimate for a SUPL enabled terminal (SET) and program code to determine service capabilities of a SUPL Location Platform (SLP). The computer-readable medium further includes program code to select and request service from the SLP that is consistent with the service capabilities of the SLP. The computer-readable medium further includes program code to communicate with the SLP to determine at least one position estimate for the SET; and program code to communicate with the SLP to provide to the SUPL agent at least one position estimate for the SET. In one aspect, no positioning parameters are provided prior to requesting service from the SLP. The computer-readable medium may further include program code to receive from the SLP a service modification request with service parameters that are modified with respect to the service requested from the SLP.

Various aspects and embodiments of the disclosure are also described in further detail below.

BRIEF DESCRIPTION OF THE DRAWING

FIG. 4 illustrates a conventional SUPL ULP architecture with intertwined service and positioning layers.

DETAILED DESCRIPTION

The techniques described herein may be used for various wireless networks such as Code Division Multiple Access (CDMA) networks, Time Division Multiple Access (TDMA) networks, Frequency Division Multiple Access (FDMA) networks, Orthogonal FDMA (OFDMA) networks, networks supporting a combination of the aforementioned technologies, networks with wireless wide area network (WWAN) coverage and/or wireless local area network (WLAN) coverage, a wireless personal area network (WPAN). A CDMA network may implement one or more radio access technologies (RATs) such as Wideband-CDMA (W-CDMA), cdma2000, and so on. Cdma2000 covers IS-2000, IS-856, and IS-95 standards. A TDMA network may implement one or more radio technologies such as Global System for Mobile Communications (GSM), Digital Advanced Mobile Phone System (D-AMPS) or some other RAT. D-AMPS covers IS-136 and IS-54. These various radio technologies and standards are known in the art. W-CDMA and GSM are described in documents from an organization named "3rd Generation Partnership Project" (3GPP). Cdma2000 is described in documents from an organization named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. The techniques may also be used to help locate a device communicating using a wireline IP capable network such as a network providing DSL or cable access and/or may be used to support client devices communicating using a wireline network.

The techniques may also be used for various location architectures such as user plane architectures. A user plane is a mechanism for carrying data for higher-layer applications and employing a user-plane bearer, which is typically implemented with protocols such as User Datagram Protocol (UDP), Transmission Control Protocol (TCP), and Internet Protocol (IP), all of which are known in the art. Messages supporting location services and positioning are carried as part of data in a user plane architecture. The techniques may be used for Secure User Plane Location (SUPL) and pre-SUPL architectures promulgated by Open Mobile Alliance (OMA), a 3GPP control plane architecture described in 3GPP TS 23.271, TS 43.059, and TS 25.305, a 3GPP2 control plane architecture described in IS-881 and 3GPP2 X.S0002, a 3GPP2 user plane architecture described in X.S0024, and so on. For clarity, the techniques are described below for Secure User Plane Location (SUPL).

Figure 1:
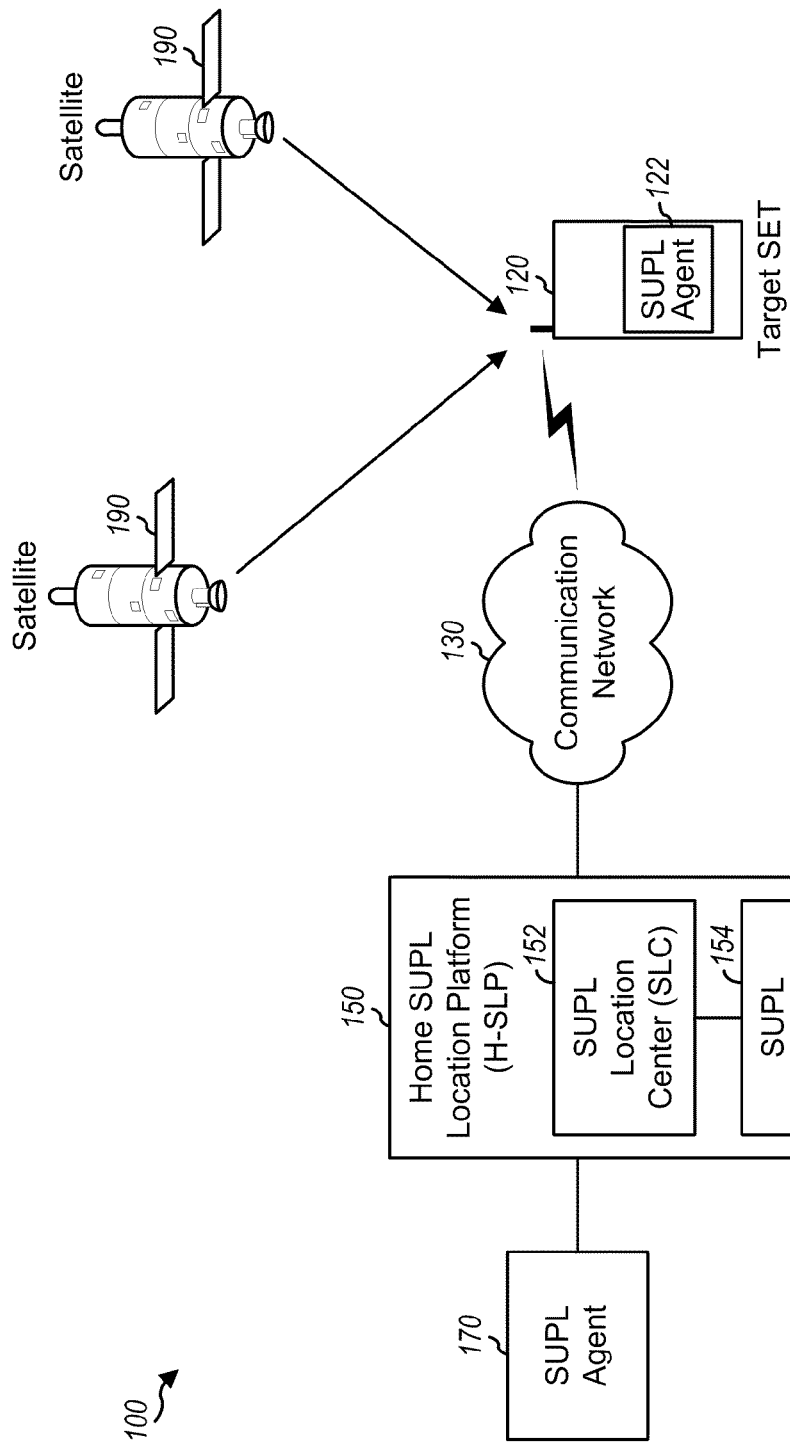
FIG. 1 shows a network architecture capable of providing location services for SUPL enabled terminals (SETs).

FIG. 1 shows a network architecture 100 capable of providing location services for SUPL enabled terminals (SETs). A SET is a device capable of communicating with SUPL capable entities that support positioning and location services for SETs. For simplicity, only one SET 120 is shown in FIG. 1. SET 120 may be stationary or mobile and may also be called a mobile station (MS), a user equipment (UE), a terminal, a station, a subscriber unit, or some other terminology. SET 120 may be a cellular phone, a personal digital assistant (PDA), a wireless modem, a personal computer, a laptop computer, a telemetry device, a tracking device, and so on. For example, SET 120 may be a UE in Universal Mobile Telecommunication System (UMTS), an MS in GSM or cdma2000, a personal computer in an IP-based network, and so on.

SET 120 may include a SUPL agent 122 capable of accessing SUPL capable entities. SET 120 may also be a target SET, which is a SET whose position is being sought by a SUPL agent that may be internal or external to the SET. SET 120 may perform functions such as privacy, security, positioning measurement and position calculation for location services.

SET 120 may communicate with a communication network 130 for various services such as voice, packet data, messaging, and so on. SET 120 may also communicate with SUPL capable entities via network 130. Network 130 may be a wireless network such as a cdma2000 network, an LTE network, a UMTS network, a GSM network, some other radio access network (RAN), a WLAN, and so on. Network 130 may also be a wireline network such as an IP-based network, a phone network, a cable network, and so on. In some cases, network 130 may comprise multiple individual networks (e.g. an LTE network and a separate UMTS network each connected to the Internet). In such a case, SET 120 and H-SLP 150 may connect to different networks—e.g. SET 120 may connect to an LTE network whereas H-SLP may connect to a UMTS network. SET 120 may also receive signals from one or more satellites 190, which may be part of the Global Positioning System (GPS), the European Galileo system, the Russian Glonass system, or some other satellite positioning system. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

SET 120 may measure signals from satellites 190 and/or base stations in network 130 and may obtain pseudo-range measurements for the satellites and network measurements from the base stations. The pseudo-range measurements may be used to derive a position estimate for SET 120.

A Home SUPL Location Platform (H-SLP) 150 is responsible for SUPL service management and position determination. Normally, a SET (e.g. SET 120) will have a single H-SLP (e.g. H-SLP 150) which is provided by the home network operator for the SET user. In addition to H-SLPs, there are also E-SLPs (emergency service SLPs, which support determining the location of a SET when there is an emergency call), V-SLPs (Visited SLP, which may assist the H-SLP to obtain the SET location when the SET is not served by the home network), and D-SLPs (Discovered SLP which would typically be associated with a visited network and not the home network and may provide location services to the SET without involving the H-SLP 150). In FIG. 1, H-SLP 150 represents an H-SLP, but it may also represent a D-SLP or E-SLP and thus, H-SLP 150 is sometimes referred to simply as SLP 150. SUPL service management may include managing locations of SETs and storing, extracting, and modifying location information of target SETs. H-SLP 150 includes a SUPL Location Center (SLC) 152 and typically includes a SUPL Positioning Center (SPC) 154. SLC 152 performs various functions for location services, coordinates the operation of SUPL, and interacts with SETs over user plane bearer. SLC 152 may perform functions for privacy, initiation, security, roaming support, charging/billing, service management, position calculation, and so on. SPC 154 supports positioning for SETs, is responsible for messages and procedures used for position calculation, and supports delivery of assistance data to the SETs. SPC 154 may perform functions for security, assistance data delivery, reference retrieval, position calculation, and so on. An SPC may have access to GPS receivers (a reference network, perhaps a global one) and may receive signals for satellites so that it can provide assistance data.

A SUPL agent (e.g., SUPL agent 122 or 170) is a function or an entity that obtains location information for a target SET. In general, a SUPL agent may reside in a network entity (e.g., SUPL agent 170) or a SET (e.g., SUPL agent 122) or may be external to both the network and the SET. In the case of a SET resident SUPL agent, the SUPL Agent may or may not access network resources to obtain the location information and, as in SET-based mode, positioning and resource access from the network may not be one-for-one (e.g. a SET may use resources obtained once from the network to support location determination at several different times). A network resident SUPL agent may utilize Mobile Location Services applications (MLS Apps) to access an H-SLP or a requesting network, which includes a Requesting SLP (R-SLP) that supports location services for SUPL agents. An MLS application is an application that requests and consumes location information. Location information may be any information related to location and may comprise various types of position estimate (e.g., latitude and longitude coordinates, latitude and longitude with an expected error estimate, etc). MLS covers interaction between a SUPL agent and an H-SLP, R-SLP, D-SLP or E-SLP, whereas SUPL covers interaction between an H-SLP, E-SLP, V-SLP or D-SLP and a SET.

Figure 2:
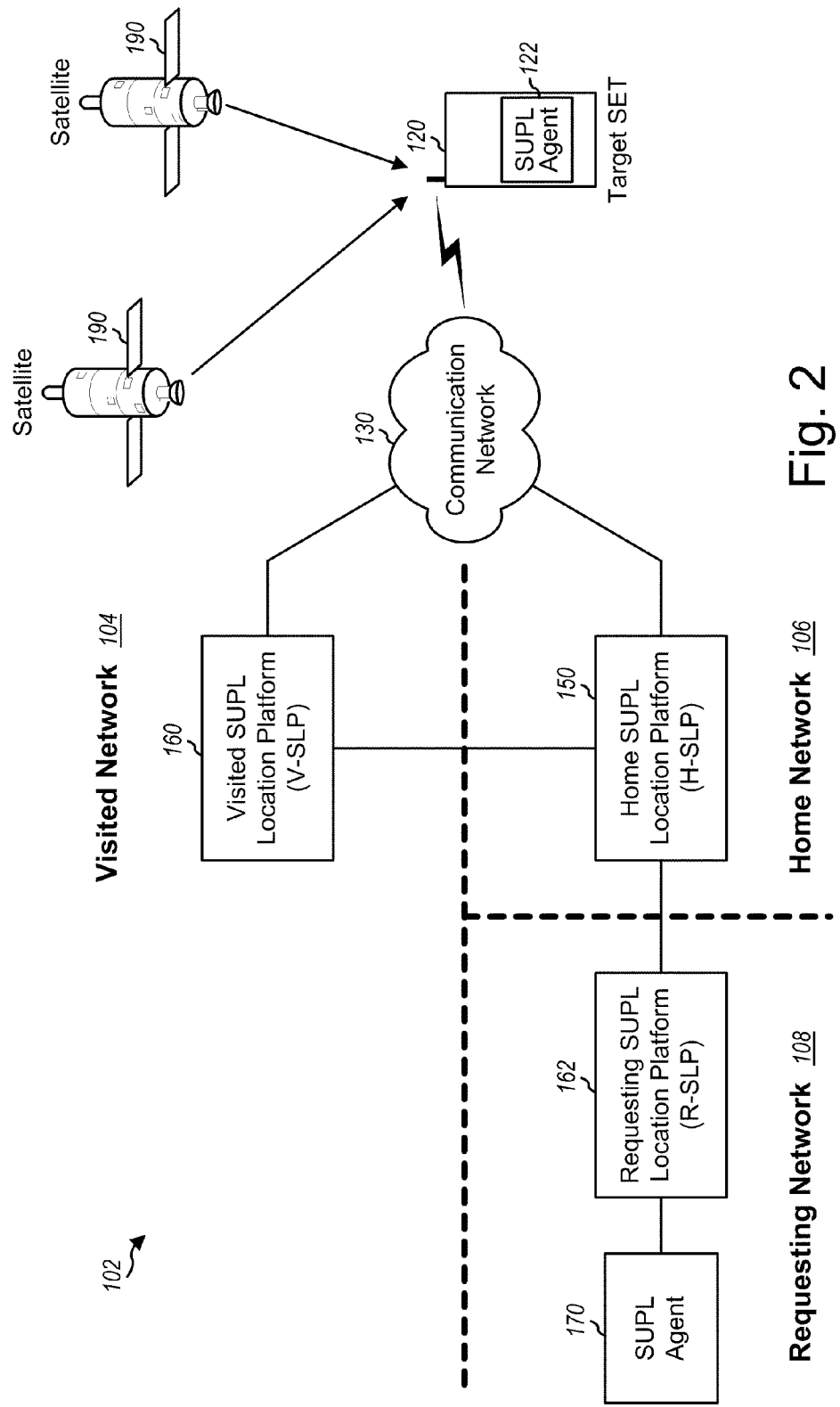
FIG. 2 shows a network architecture that includes a visited/serving network, a home network, and a requesting network.

FIG. 2 shows a network architecture 102 that includes a visited/serving network 104, a home network 106, and a requesting network 108. Visited network 104 includes a V-SLP 160. Home network 106 includes H-SLP 150 that supports location services and positioning. Requesting network 108 includes an R-SLP 162 that supports location services for SUPL agents. H-SLP 150, V-SLP 160, and R-SLP 162 each includes an SLC and may include an SPC, which operate as described above for FIG. 1. In some embodiments, the visiting network 104 with V-SLP 160 may be eliminated.

The SUPL entities in FIGS. 1 and 2 are similar to that described in U.S. application Ser. No. 11/510,332, filed Aug. 24, 2006, and entitled "Location Reporting with Secure User Plane Location (SUPL)", with Publication No. US 2007/0182547, which is assigned to the assignee hereof and the entirety of which is incorporated herein by reference, as well as document OMA-AD-SUPL-V2_0-20060619-D, entitled "Secure User Plane Location Architecture," Draft Version 2.0, June 2006, which is publicly available from OMA, which describe location based services known as SUPL 2.0. The network entities in FIGS. 1 and 2 may also be referred to by other names in other networks and other location architectures. For example, in a 3GPP-based network (e.g., a UMTS network), an SLC is called a Gateway Mobile Location Center (GMLC), an SPC is called a Serving Mobile Location Center (SMLC), a SET is called a UE, and a SUPL agent is called an LCS client. The functions and signaling performed by the 3GPP entities are similar to those performed by the corresponding SUPL entities, thereby enabling comparable services and capabilities. In general, an SLC may be called a location center, an LCS server, a location server, a Mobile Positioning Center (MPC), and so on. An SPC may be called a positioning entity, a positioning center, a Position Determination Entity (PDE), and so on. While SUPL 2.0 is known as a secure means to efficiently provide location based services, improvements are desired. For example, the number of messages exchanged between participating entities to support a particular type of location request might be reduced. In addition, a common message flow might be used for different types of location service that in SUPL 2.0 require support of different message flows.

SUPL may support the following positioning methods (among others): SET assisted A-GPS, SET assisted A-GNSS, SET based A-GPS, SET based A-GNSS, Autonomous GPS or autonomous GNSS; Advanced forward link trilateration (A-FLT); SET assisted and/or SET based Enhanced observed time difference (EOTD); SET assisted and/or SET based Observed time difference of arrival (OTDOA) for UMTS and/or for LTE; SET assisted and/or SET based Enhanced cell/sector and cell-ID; SET assisted and/or SET based WiFi positioning, SET assisted and/or SET based Short Range Node (SRN) positioning and various SET assisted and/or SET based Hybrid combinations of these.

For a SET based mode, the position of the SET is determined by the SET, possibly with assistance data from an SPC. For a SET assisted mode, the position of the SET is determined by the SPC with assistance (e.g., measurements) from the SET. The autonomous GPS and GNSS methods and the A-GPS and A-GNSS methods derive a position estimate for the SET based solely on satellite measurements and have high accuracy. The hybrid method derives a position estimate based on multiple position methods and has high accuracy and high reliability if GPS and/or GNSS are included. The A-FLT, EOTD, and OTDOA methods derive a position estimate based on measurements of base station timing made by the SET and have good accuracy. The enhanced cell/sector and cell-ID methods derive a position estimate based on known positions of cell/sectors of a cellular network and have coarse accuracy. For the enhanced cell/sector method, the position estimate may also be derived based on network measurements such as radio signal timing and signal strengths. The WiFi and SRN methods employ signal measurements from WiFi Access Points and short range nodes (e.g. Bluetooth) and normally have high accuracy. These various positioning methods are known in the art. The terms "position estimate", "location estimate", and "position fix" are often used interchangeably. A position estimate may be given in absolute coordinates (e.g., latitude and longitude), in relative coordinates (e.g. number of meters north and east of a known fixed location) or as a civic address (e.g. street address, city and country) or as some combination of these and may provide the expected error (e.g. may provide a geographic area that represents possible locations of a SET).

SUPL may support various services, four of which are shown in Table 1.

TABLE 1

| Location Service | Description |
| --- | --- |
| Immediate location service | Provide location information (e.g., the location of a target SET) immediately when requested. |
| Deferred location | Provide location information multiple times based on |

TABLE 1-continued

| Location Service | Description |
| --- | --- |
| service | periodic triggers or after a specific event has occurred. |
| Assistance data service | Provide single, multiple or continuous assistance data transfer. |
| SUPL connection service | Establishment of secure SUPL session context for extended time periods. |

Immediate location services may also be referred to as network initiated, SET initiated, roaming, non-roaming, and so on. Deferred location services may include periodic and/or triggered services. For triggered services, the reporting of position estimates is determined by triggers or a trigger mechanism that indicates when to report the SET location to a SUPL agent. The triggers may be determined by the SUPL agent, sent to the H-SLP, and then forwarded to the target SET. Periodic triggers for periodic triggered service may comprise a periodic interval, the number of position reports, and a possible start time to begin reporting. Triggers may be related to area events, a change in the location or velocity of a SET or to other conditions. Area event triggers for area event triggered service may correspond to the SET entering, leaving or remaining within a predefined geographic area. Triggers related to a change in the location or velocity of a SET may correspond to the SET location, velocity or acceleration changing by predefined thresholds. Triggers may also be combined such that the location of a SET is only obtained when two or more trigger conditions have occurred or when only one of several alternative triggers has occurred. Additional or other services may also be supported.

Location services may be categorized as shown in Table 2.

TABLE 2

| Location Service | Description |
| --- | --- |
| Network initiated (NI) services | Services that originate from the network, with the SUPL agent residing in or having access to the network. |
| SET initiated (SI) services | Services that originate from the SET, with the SUPL agent residing within or having access to the SET. |

Network initiated may also be referred to as mobile terminated. SET initiated may also be referred to as mobile originated.

SUPL supports two communication modes between a SET and an SLP for positioning with an SPC. Table 3 summarizes the two communication modes.

TABLE 3

| Communication Mode | Description |
| --- | --- |
| Proxy mode | The SPC does not have direct communication with the SET, and the SLC acts as a proxy between the SET and the SPC. |
| Non-proxy mode | The SPC has direct communication with the SET. |

SUPL supports roaming and non-roaming for a SET. Table 4 summarizes several roaming and non-roaming modes.

TABLE 4

| Roaming/Non-roaming | Description |
| --- | --- |
| Non-roaming | The SET is within the service area of its H-SLP. |
| Roaming with H-SLP positioning | The SET is outside the service area of its H-SLP, but the H-SLP still provides location functionality. |
| Roaming with V-SLP positioning | The SET is outside the service area of its H-SLP, and a V-SLP provides location functionality |

As used herein, roaming and non-roaming are with respect to SUPL, and not with respect to communication network 130. Network 130 may have different definition and criteria on roaming and non-roaming, which are not discussed herein.

The service area of an H-SLP is an area within which the H-SLP can provide a position estimate for a SET or relevant assistance data to a SET without contacting other SLPs. When the SET is roaming, the H-SLP may provide location functionality (e.g., position determination and SPC functionality) or may request a V-SLP to provide this location functionality.

A set of message flows may be defined for each of the supported location services. Each message flow may be applicable for a specific location service and a specific set of conditions, e.g., proxy or non-proxy, roaming or non-roaming, network initiated or SET initiated, and so on. A specific message flow may be used to obtain the desired location service for the applicable conditions.

Figure 3:
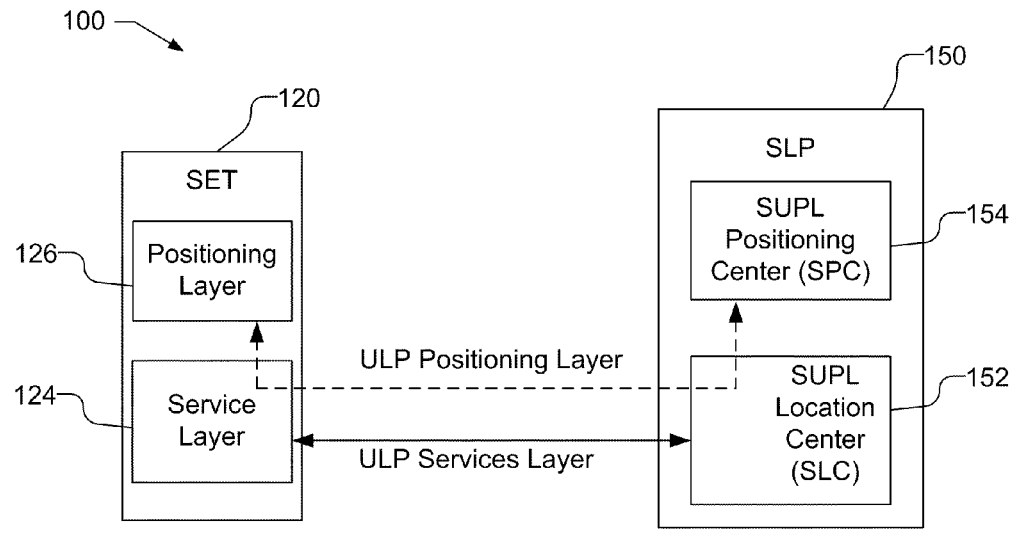
FIG. 3 illustrates another view of the SUPL ULP architecture with separated service and positioning layers.

FIG. 3 illustrates another exemplary view of the architecture 100 applicable to the SUPL User plane Location Protocol (ULP), which is the protocol used by SUPL between a SET and an SLP. As can be seen in FIG. 3, a service layer 124 and a positioning layer 126 are separated through the use of different ULP messages, where ULP service layer messages between SET 120 and SLC 152 in SLP 150 are illustrated with a solid line and ULP positioning messages between SET 120 and SLC 152 in SLP 1502 are shown with broken lines. As illustrated, the ULP services layer message between SET 120 and SLC 152 in SLP 150 contains no positioning components, so that all positioning related components are encapsulated in the ULP positioning layer messages between SET 120 and SLC 152 in SLP 150. Thus, ULP messages in the positioning layer in the SUPL ULP architecture 100, while transported through the service layer, are completely transparent to the service layer and do not carry any service layer parameters. Similarly, ULP messages in the service layer do not convey any parameters directly related to positioning (e.g. location id, requested assistance data, A-GNSS or A-GPS Fine Time Assistance (FTA), etc.). ULP messages in the positioning layer (e.g. SUPL POS, SUPL POS INIT) would normally convey embedded messages defined by a separate positioning protocol such as LTE Positioning Protocol (LPP defined in 3GPP TS 36.355), Radio Resource LCS Protocol (RRLP defined in 3GPP TS 44.031), Radio Resource Control (RRC defined in 3GPP TS 25.331), IS-801 known also as TIA-801 (defined in 3GPP2 TS C.S0022) or LPP combined with LPP extension (LPPe defined in OMA-TS-LPPe-V1 from OMA). In particular, except for conveying positioning protocol messages (e.g. for RRLP, RRC, LPP or IS-801), there are no positioning parameters in SUPL ULP messages: all SUPL ULP parameters thus relate to the service layer and anything related to positioning falls under a separate positioning protocol. This restriction separates the service and positioning layers.

As an alternative to the exemplary view of architecture 100 shown in FIG. 3, messages in the ULP positioning layer may be conveyed directly between positioning layer 126 in SET 120 and SPC 154 in SLP 150. In yet another alternative, positioning layer 126 in SET 120 and SPC 154 in SLP 150 might each exchange positioning protocol messages with service layer 124 and SLC 152, respectively with service layer 124 and SLC 152 exchanging these message inside ULP positioning messages (e.g. SUPL POS, SUPL POS NIT) exchanged between SET 120 and SLP 150 without being aware of the content of the positioning protocol messages.

In the SUPL 2.0 architecture defined by OMA, the architecture shown in FIG. 3 cannot be used, as SUPL 2.0 requires that some ULP messages exchanged between service layer 124 in SET 120 and SLC 152 in SLP 150 also carry positioning related parameters that are defined as part of ULP and not use a separate positioning protocol like RRLP, TIA-801 or LPP. This means that the services layer (solid arrow in FIG. 3) is no longer separate from the positioning layer (broken arrow in FIG. 3) but instead the layers (and hence the arrows) need to be combined in some way. One illustration of this is shown in FIG. 4

The SUPL ULP architecture 100 simplifies the ULP protocol and reduces the number of call flows required for covering all use cases, relative to known SUPL ULP architectures. In one embodiment, the SUPL ULP architecture 100 may include one or more of the following simplifications: only proxy mode is supported; only one roaming model (roaming with H-SLP) is supported; and only LPP and TIA-801 are supported as positioning protocols.

Figure 5:
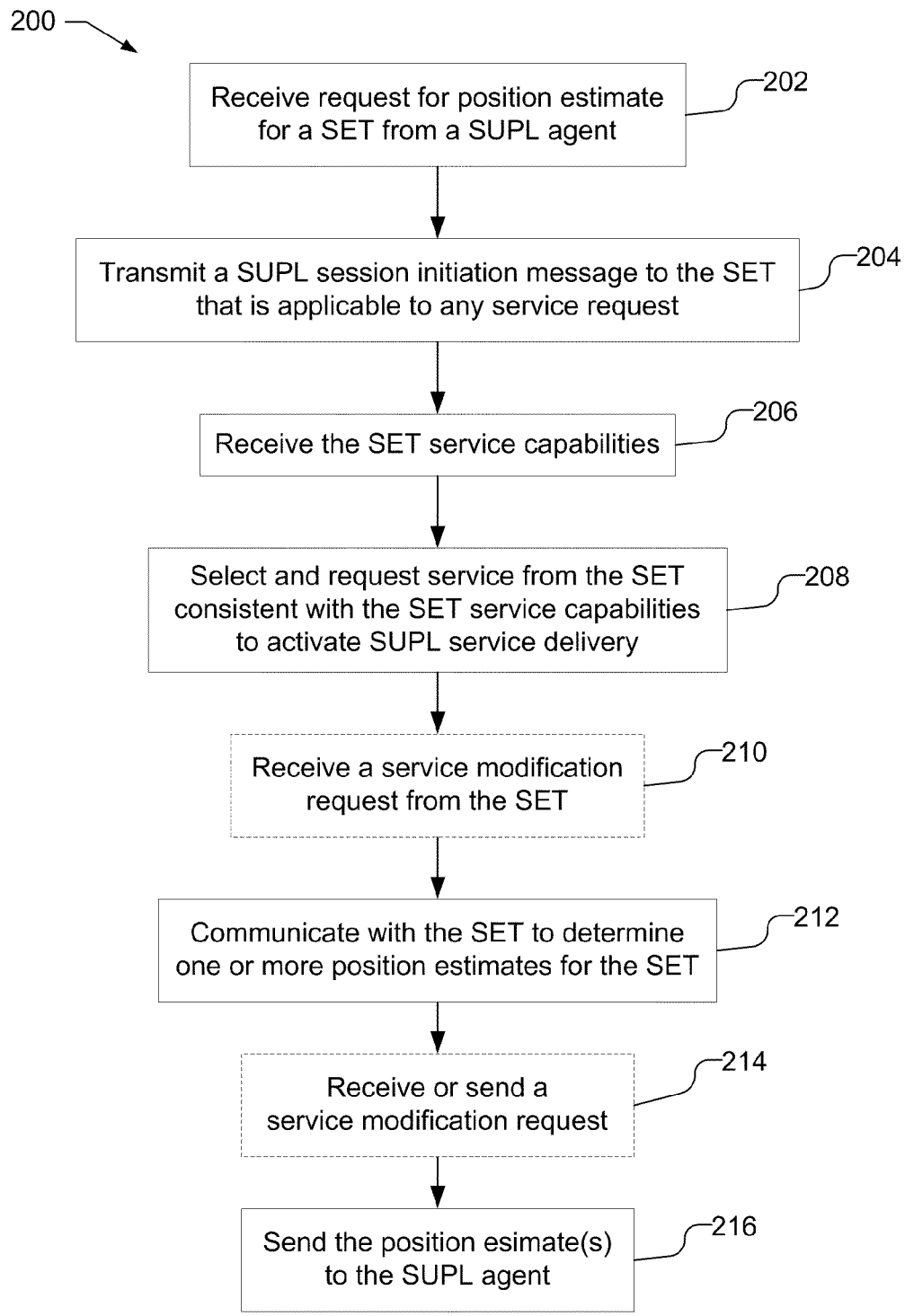
FIG. 5 is a flow chart illustrating a SUPL positioning process that may be performed by the SLP.

FIG. 5 is a flow chart 200 illustrating a SUPL positioning process that may be performed by the SLP 150 in SUPL ULP architecture 100. The SLP 150 receives a request for a position estimate for the SET 120 from SUPL agent 170 (202). The SLP 150 transmits a SUPL session initiation message to the SET 120 that is applicable to any service request (204). Thus, the initiation message may be the same for immediate location service or deferred location service, such as a periodic or area event triggered service. This reduces the impacts to SET 120 and SLP 150 in supporting different services since processing of the initiation message does not depend on a particular service. In addition, new services can be added later to SUPL without affecting the initiation message (e.g. without requiring a new or modified initiation message). Furthermore, because the initiation message does not need to indicate services or capabilities, it can be a small message that may be easier to transfer by some means of delivery such as SMS. In response, the SLP 150 receives a request for a secure IP connection from SET 120 and, once this connection has been established, receives the service capabilities of the SET 120 (206). The SLP 150 selects and requests services from the SET 120 that are consistent with the service capabilities of the SET 120, which activates the SUPL service delivery (208). The SLP 150 may provide the SLP service capabilities to the SET 120 in response to receipt of the service capabilities of the SET 120. In one embodiment, no positioning parameters are provided prior to requesting service from the SET 120. Optionally, the SLP 150 may receive from the SET 120 a service modification request, which has service parameters that are modified with respect to the service requested from the SET 120 (210). The service modification request may support particular preferences of the SET user—e.g. a preference that any location estimate provided to SUPL Agent 170 be less accurate (i.e. have a higher probable error) than that requested by SLP 150 or that locations estimates that were requested periodically by SLP 150 occur at a lower frequency than that requested. The service modification may also support temporary limitations of SET 120—e.g. may reduce location accuracy or the frequency of periodic location if SET 120 processor or memory utilization is currently high. The SLP 150 communicates with the SET 120 to determine at least one position estimate for the SET 120 during SUPL service delivery (212). For example, the service may be an immediate location a single immediate position may be produced. If the service is for deferred location, multiple positions may be periodically generated or generated based on other trigger events. Optionally, the SLP 150 may receive from the SET 120, or send to the SET 120, a service modification request, which has service parameters that are modified with respect to the service requested from the SET 120 or subsequently modified by the SET (214). The one or more position estimates are sent to the SUPL agent 170 (216).

Figure 6:
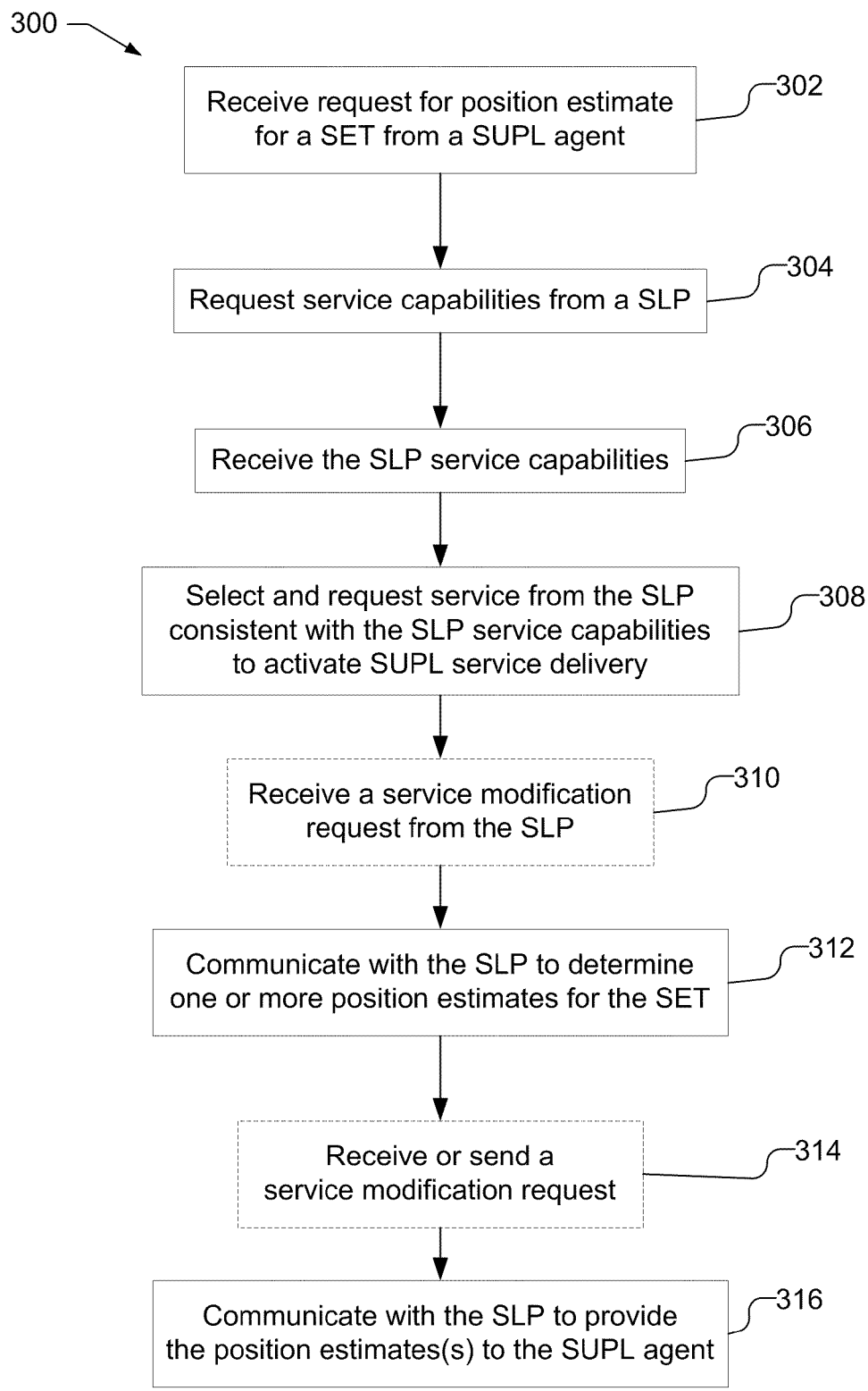
FIG. 6 is a flow chart illustrating a SUPL positioning process that may be performed by the SET.

FIG. 6 is a flow chart 300 illustrating a SUPL positioning process that may be performed by the SET 150 in SUPL ULP architecture 100. The SET 120 receives a request for a position estimate for the SET 120 from SUPL agent 122 (302). The SET 120 establishes a secure IP connection to SLP 150 and then requests the service capabilities from the SLP 150 to start a SUPL initiation session with the SLP 150 (304). The SET 120 may provide service capabilities of the SET 120 to the SLP 150 with the request from the service capabilities of the SLP 150. The SET 120 receives the service capabilities from the SLP 150 in response (306). The SET 120 selects and requests services from the SLP 150 that are consistent with the service capabilities of the SLP 150, which activates the SUPL service delivery (308). In one embodiment, no positioning parameters are provided prior to requesting service from the SLP 150. Optionally, the SET 120 may receive from the SLP 150 a service modification request, which has service parameters that are modified with respect to the service requested from the SLP 150 (310). The modified service parameters may support preferences of the SLP 150 service provider—e.g. may provide lower location accuracy or less frequent periodic location or less assistance data than was requested. The SET 120 communicates with the SLP 150 to determine at least one position estimate for the SET 120 during SUPL service delivery (312). For example, the service may be an immediate location a single immediate position may be produced. If the service is for deferred location, multiple positions may be periodically generated or generated based on other trigger events. Optionally, the SET 120 may receive from the SLP 150, or send to the SLP 150, a service modification request, which has service parameters that are modified with respect to the service requested from the SLP 150 or subsequently modified by SLP 150 (314). The SET 120 communicates with the SLP 150 to provide to the SUPL agent 122 at least one position estimate for the SET 120 during the SUPL service delivery session.

FIGS. 7-15 illustrate example call flows for the SUPL ULP architecture 100. The flows for the SUPL ULP architecture 100 include support for existing SUPL services including immediate single fix, triggered periodic service, and triggered area event service. The SUPL ULP architecture 100 further includes support for other services, such as periodic assistance data delivery. In general, the basic call flows for SUPL ULP architecture 100 consist of four primary building blocks: Capability Transfer, Service Activation, Service Delivery and Service Termination.

An optional extended call flow may include an additional building block for Service Modification. Service Modification may be used to permit better privacy, which is becoming an increasingly important requirement for commercial location services For example, a SET 120 user may be willing to be located by a SUPL Agent but may want to control the level of service—e.g. location accuracy, duration and frequency of a periodic session. Thus, rather than abort and later attempt to restart a session, Service Modification allows a session to continue at a maximum service level that the user will accept. Service Modification may be performed modification immediately after service activation to allow modification of service parameters (not the service itself) based on privacy requirements and positioning capabilities. Service Modification may also be used to modify an ongoing deferred location session—e.g. increase the frequency of location for a navigation service when a user needs more frequent and precise directions. Service Modification can reuse parameters defined for Service Activation and may be a simple extension from a signaling perspective. The use of service modification permits better privacy and more flexible service delivery.

The SUPL call flows provided herein use examples for single fix and triggered periodic fix services in non-roaming mode, as well as examples of LPP and TIA-801 call flows. The presented call flows are meant to illustrate the concept and do not contain details such as security, notification, etc.

Figure 7:
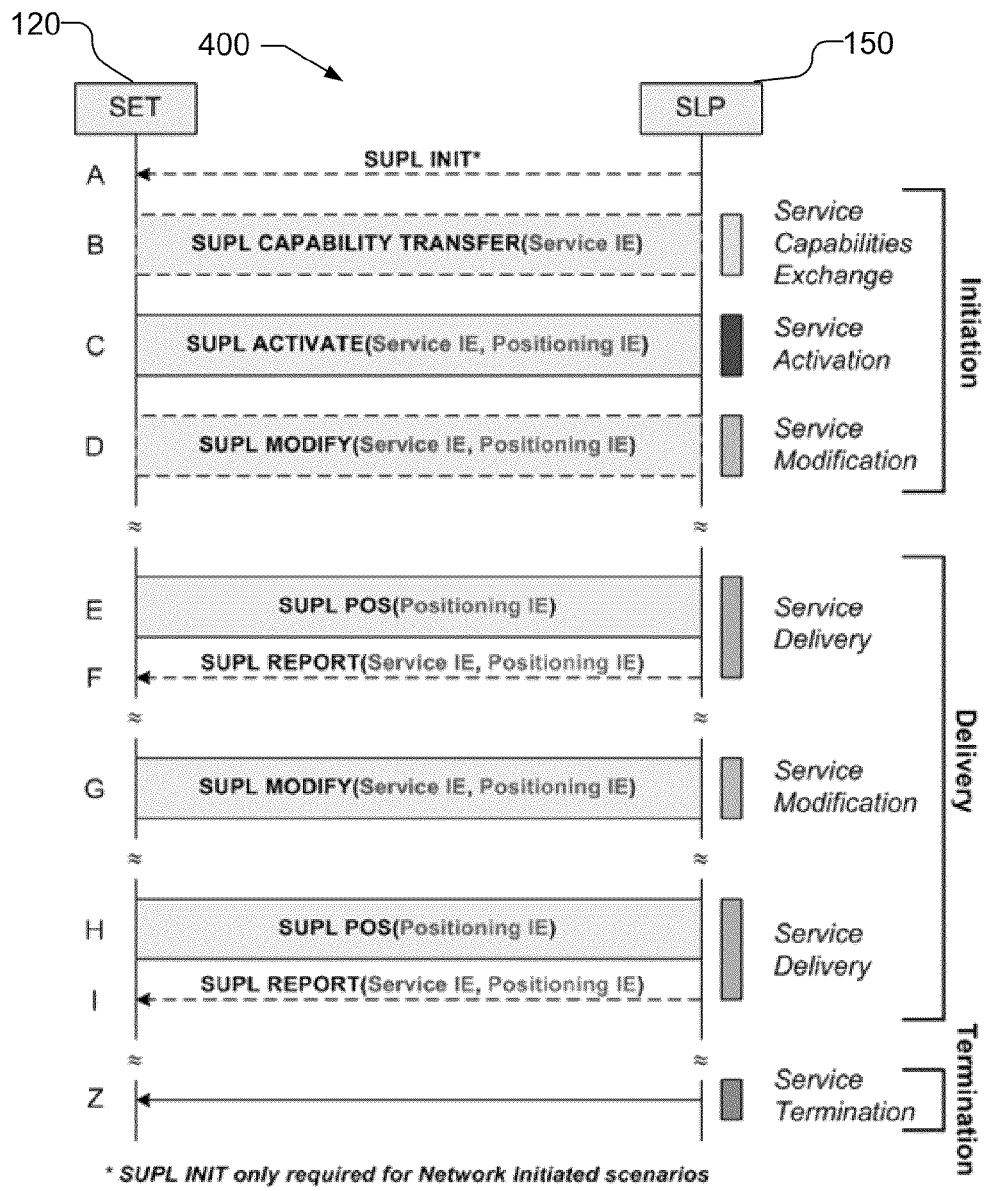
FIG. 7 shows an embodiment of a generalized message flow.

FIG. 7 shows an embodiment of a generalized message flow 400 for the SUPL ULP architecture 100. The call flow includes three phases: Initiation, Delivery; and Termination. Initiation includes Service Capabilities Exchange (step B) and Service Activation (step C), as well as a SUPL NIT initiation message from the SLP 150 to the SET 120 (step A), which is only required for network initiated scenarios. Additionally, during the Initiation phase, an optional Service Modification may be performed (step D). During Service Capabilities Exchange, SUPL CAPABILITY TRANSFER messages may be exchanged between the SET 120 and SLP 150 to provide their respective service capabilities i.e., capabilities they are able and willing to support for the SUPL session. During the Service Activation, a SUPL ACTIVATE message is provided by the SET 120 (for a SET Initiated service request) or SLP 150 (for a Network Initiated service request) to activate the SUPL service by requesting a service in line with their capabilities. During Service Modification, a SUPL MODIFY message may be provided by the SLP 150 (for a SET Initiated service request) or SET 120 (for a Network Initiated service request) to request a service modification based on information (e.g. service parameters or the identity of the SUPL Agent) received during Service Activation. As long as service is reduced and not increased (e.g. via a request for lower rather than higher location accuracy or less frequent rather than more frequent periodic location), there is no need to acknowledge the serviced modification request because it is certain that the recipient of the request can support a reduced service.

During the Delivery phase, Service Delivery is performed (steps E, F and steps H, I). Steps H and I are used for deferred location services (e.g. triggered periodic location delivery), and are not used for an immediate location service such as an immediate single fix. During Service Delivery, one or more SUPL POS messages are exchanged between SET 120 and SLP 150 in step E and, for deferred location service, in step H to deliver the requested service (location information or assistance data). For deferred location services, one or more instances of step H may occur. In a SET initiated session, and where applicable, the SLP 150 may return the position estimate (position) to the SET with a SUPL REPORT message (steps F and I). For deferred location services, one instance of step I may occur for each instance of step H. Additionally, during the Delivery phase, an optional Service Modification may be performed (step G) at any point during Service Delivery. During Service Modification, SET 120 may send a request to SLP 150 or SLP 150 may send a request to SET 120 to change one or more parameters related to the service being performed—e.g. may request higher or lower location accuracy or a higher or lower frequency of location. If the request is to increase or improve service (e.g. increase location accuracy or the frequency of periodic location), the recipient of a service modification request may return an acknowledgment if the new service can be supported.

During the Termination event, Service Termination is performed (steps Z), during which the SUPL session is terminated by the SLP 150. During service termination, the entity that initiated the service (either SET 120 or SLP 150) may send a SUPL END to the other party.

As discussed above, the services layer is separate from the positioning layer. Accordingly, exchanged messages, such as SUPL CAPABILITY TRANSFER message (step B), SUPL ACTIVATE message (step C), SUPL MODIFY (steps D, G) may include Service parameters but no positioning messages. Positioning protocol messages but no service related parameters may be encapsulated in other ULP messages, e.g., SUPL POS (step E and H). To provide extra flexibility, some service related messages (e.g. SUPL ACTIVATE) may optionally carry positioning protocol messages that are transparent to the service layer and transferred between SET positioning layer 126 and SLC 154.

Figure 8:
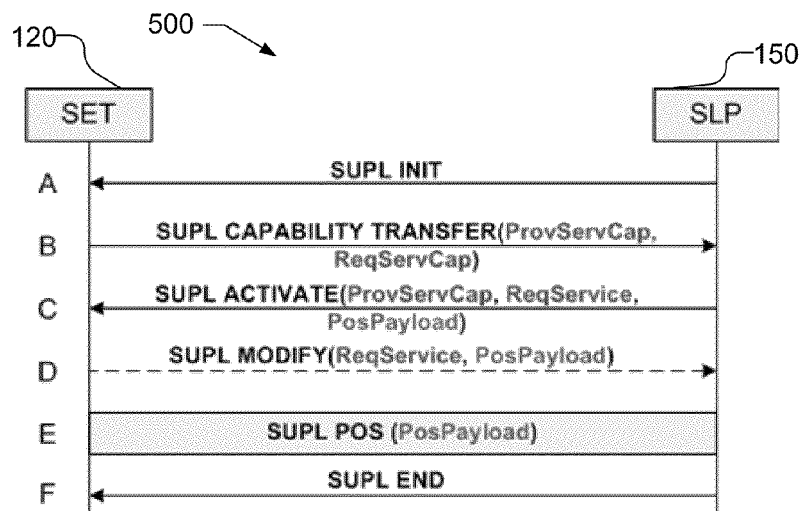
FIG. 8 shows an embodiment of a message flow for a network initiated single fix service.

FIG. 8 shows an embodiment of a message flow 500 for a network initiated single fix service. SLP 150 starts a Network Initiated SUPL session with SET 120 by sending a SUPL NIT message to SET 120 (step A). The SET 120 may establish a secure IP connection to SLP 150 and provides its service capabilities (ProvServCap) (i.e., the services it is willing and able to support) and requests the SLP's service capabilities (ReqServCap) in SUPL CAPABILITY TRANSFER (step B). The SUPL CAPABILITY TRANSFER in step B may also include the positioning protocols supported by SET 120. In line with the service capabilities of SET 120, the SLP 150 selects and requests the service (ReqService), in this case a single immediate fix, in SUPL ACTIVATE (which activates the SUPL service). The SLP also provides its service capabilities (ProvServCap) and may also send positioning information within a positioning protocol message (PosPayload) (step C). The positioning information may include the positioning capabilities of SLP 150, a request for the positioning capabilities of SET 120, positioning assistance data or some combination of these. The positioning protocol message in step C may correspond to a positioning protocol that SET 120 indicated it supports in step B. The SET 120 evaluates the service request and, depending on further information received about the service requested (e.g., SUPL Agent ID, etc.), may optionally modify the service (e.g., different QoP) and returns a modified service request (ReqService) with modified service parameters to the SLP in SUPL MODIFY (step D). The SET 120 may also send positioning information within a positioning protocol message (PosPayload) in SUPL MODIFY. The positioning information may include the positioning capabilities of SET 120, some location measurements made by SET 120 or a request for positioning assistance data or some combination of these. The SET 120 and SLP 150 engage in a SUPL POS session exchanging positioning protocol messages (PosPayload) contained within one or more SUPL POS messages and SLP 150 obtains a position estimate (step E). The SLP 150 terminates the SUPL session (step F).

Figure 8A:
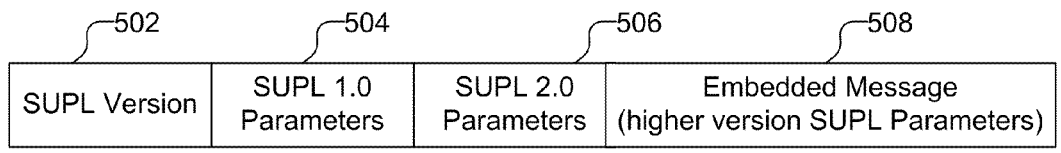
FIG. 8A illustrates an example of a SUPL INIT message that may be used with the message flows of FIGS. 8, 9, 12, and 13.

The SUPL INIT message sent in step A of FIG. 8 may need to be recognized and partially decoded by a SET 120 that does not support the service being invoked in FIG. 8—e.g. may need to be recognized and partially decoded by a SET 120 that supports an earlier version of SUPL such as SUPL 1.0 or SUPL 2.0. One reason would be to allow SET 120 to establish a secure IP connection to SLP 150 and then return a SUPL END message to terminate the SUPL session and indicate to SET 150 which version or versions of SUPL SET 120 supports. This SUPL END response is supported in SUPL 1.0 and SUPL 2.0 but depends on a SET being able to decode a SUPL version number parameter in a SUPL INIT and, in the case of SUPL 2.0, also being able to decode a minimum and maximum SUPL version parameter. If SLP 150 receives in this SUPL END message the version of SUPL supported by SET 120 it can restart the session using the same version of SUPL—which may then lead to a different message flow than the one shown in FIG. 8 but one that can partly or fully support the service requested by a SUPL Agent (e.g. SUPL Agent 170). In order to ensure that SET 120 can always decode a SUPL INIT, SLP 150 may send a SUPL INIT in step A in FIG. 8 that contains the same mandatory parameters and possibly some of the same optional parameters as defined for a SUPL INIT message in SUPL 1.0 and SUPL 2.0. However, the version parameter in the SUPL INIT sent by SLP 150 in step A in FIG. 8 may indicate a higher SUPL version number (e.g. the SUPL version for which the message flow in FIG. 8 is valid). In addition, the SUPL INIT may contain an embedded message or an embedded container (e.g. a new SUPL INIT defined for a higher version of SUPL) that contains parameters applicable to the message flow in FIG. 8. For example, FIG. 8A illustrates an example of a SUPL INIT message that may be used, which includes the SUPL Version 502, SUPL 1.0 Parameters 504, SUPL 2.0 Parameters 506, as well as an embedded message or embedded container 508, which may include higher version SUPL Parameters. A SET 120 that supports this higher version of SUPL may then ignore some or all of the SUPL 1.0 and SUPL 2.0 parameters in the SUPL INIT and only interpret the parameters in the embedded message (or embedded container). Possibly the embedded message may contain no parameters in which case SET 120 may ignore some or all of the SUPL 1.0 and SUPL 2.0 parameters and obtain necessary SUPL parameters from SLP 150 in subsequent messages—e.g. in the message sent by SLP 150 in step C in FIG. 8. A SET 120 that does not support the higher version of SUPL associated with FIG. 8 will still recognize the SUPL INIT message and be able to decode the SUPL 1.0 and possibly SUPL 2.0 parameters as well as the SUPL version number contained in the SUPL INIT in step A of FIG. 8. As SET 120 will not support this version of SUPL, it will return a SUPL END message to SLP 150 indicating the version of SUPL that it does support. SLP 150 can then restart the session using the SUPL version supported by SET 120. The same type of SUPL INIT message as described here may also be sent in step A in FIG. 9, FIG. 12 and FIG. 13 in order to support a SET 120 that either does or does not support the message flows in each of these figures.

Figure 9:
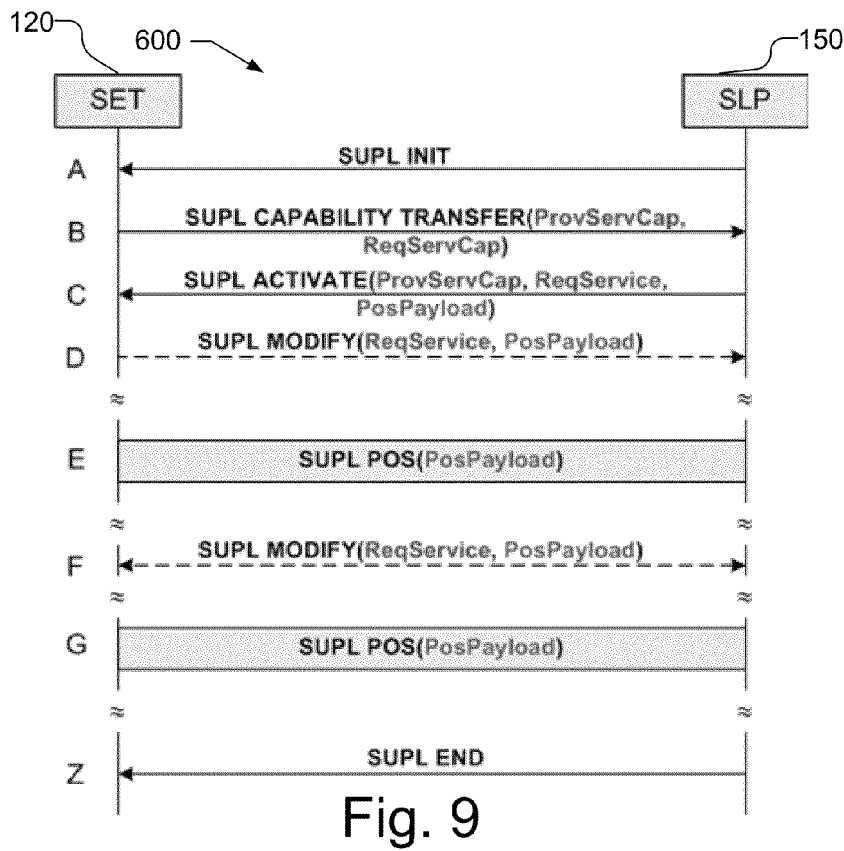
FIG. 9 shows an embodiment of a message flow for a network initiated triggered periodic service.

FIG. 9 shows an embodiment of a message flow 600 for a network initiated triggered periodic service. Initiation steps A through D in message flow 600 are the same as steps A through D in message flow 500, except that the requested service (ReqService) in step C is for a triggered periodic service. When the first position estimate is due, SET 120 and SLP 150 engage in a SUPL POS session exchanging positioning protocol messages (PosPayload) contained within one or more SUPL POS messages and the SLP 150 obtains a position estimate (and/or assistance data is delivered to the SET 120) (step E). Either the SET 120 or the SLP 150 may modify the service (i.e., service parameters), for example (QoP, interval between fixes, etc.) (step F). The SET 120 or SLP 150 may also include a positioning protocol message (PosPayload) in the SUPL MODIFY message (step F). The SET 120 and SLP 150 may engage in additional SUPL POS sessions exchanging position information as applicable (step G). The SLP 150 terminates the SUPL session (step Z).

Figure 10:
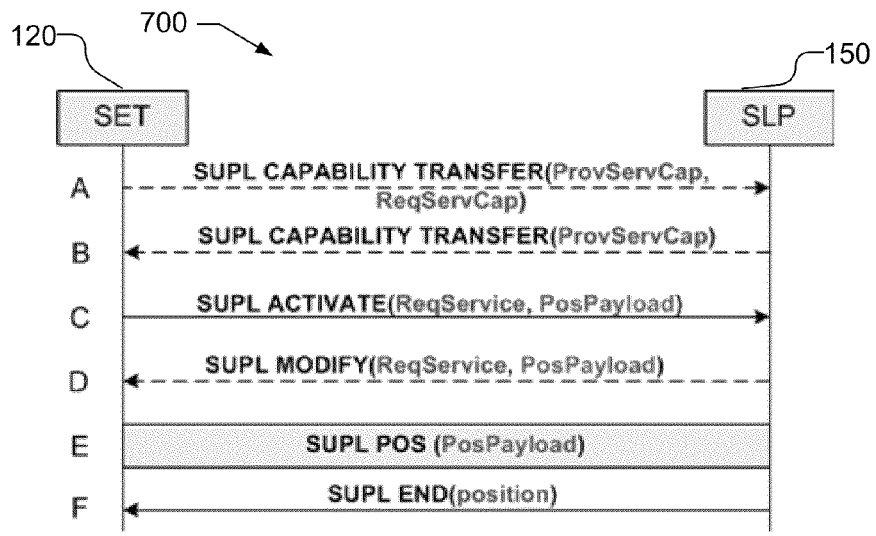
FIG. 10 shows an embodiment of a message flow for a SET initiated single fix service.

FIG. 10 shows an embodiment of a message flow 700 for a SET initiated single fix service. If the SET 120 does not already have the service capabilities of the SLP 150 (e.g. as obtained by SET 120 in a previous SUPL session), the SET 120 starts the SUPL sessions by establishing a secure IP connection to SLP 150 and then sending a SUPL CAPABILITY TRANSFER message, providing its own service capabilities (ProvServCap) and requesting the SLP's service capabilities (ReqServCap) (step A). If step A was executed, the SLP 150 provides its service capabilities (ProvServCap) to the SET in SUPL CAPABILIITES TRANSFER (step B). The SUPL CAPABILITIES TRANSFER in step B may also include the positioning protocols supported by SLP 150. The SET 120 activates the SUPL service, either after steps A and B are executed, or as the initial message if SET 120 already had the service capabilities of the SPL 150 by sending SUPL ACTIVATE (step C). The SET 120 selects and requests the service (ReqService) in line with the service capabilities of SLP 150 in SUPL ACTIVATE. The SET 120 may also send positioning information within a positioning protocol message (PosPayload) in SUPL ACTIVATE (step C). The positioning information may include the positioning capabilities of SET 120, some location measurements made by SET 120 or a request for positioning assistance data or some combination of these. The positioning protocol message in step C may correspond to a positioning protocol that SLP 150 indicated it supports in step B. The SLP 150 evaluates the service request and, depending on further information received about the service requested (e.g., SUPL Agent ID, etc.), the SLP 150 may modify the service (e.g., different QoP) by returning a modified service request (ReqService) with modified service parameters to the SET 120 in SUPL MODIFY (step D). The SLP 150 may also send positioning information (PosPayload) within a positioning protocol message in the SUPL MODIFY (step D). The positioning information may include the positioning capabilities of SLP 150 and/or positioning assistance data (e.g. as requested by SET 120 in step C). The SET 120 and SLP 150 engage in a SUPL POS session exchanging positioning protocol messages (PosPayload) contained within one or more SUPL POS messages (step E). The SLP 150 terminates the SUPL session and, if the position estimate was calculated at the SLP 150, sends the position estimate (position) to the SET 120 (step F).

Figure 11:
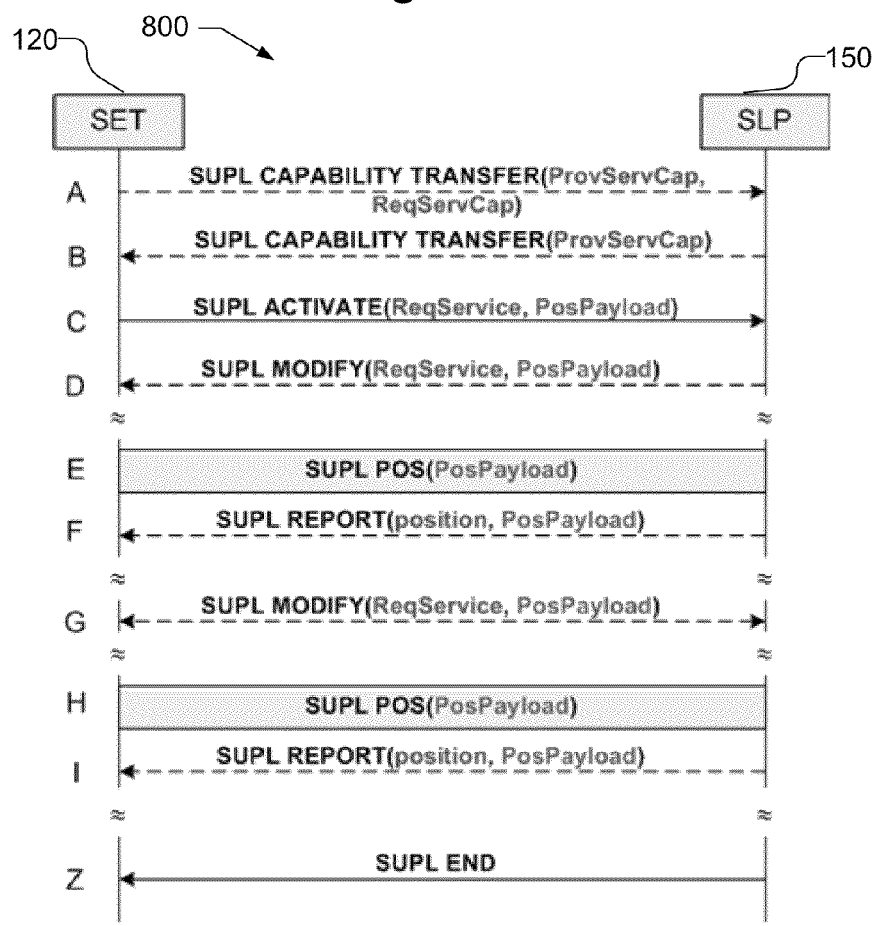
FIG. 11 shows an embodiment of a message flow for a SET initiated triggered periodic service.

FIG. 11 shows an embodiment of a message flow 800 for a SET initiated triggered periodic service. Initiation steps A through D in message flow 800 are the same as steps A through D in message flow 700, except that the requested service (ReqService) in step C is for a triggered periodic service. When the first position estimate is due, SET 120 and SLP 150 engage in a SUPL POS session exchanging positioning information within positioning protocol messages (PosPayload) contained within one or more SUPL POS messages and the SLP 150 obtains a position estimate (and/or assistance data is delivered to the SET 120) (step E). Where applicable, the SLP 150 returns the position estimate (position) to the SET 120 and may also or instead send position information (e.g. positioning assistance data) in a positioning protocol message (PosPayload) in SUPL REPORT (step F). Either the SET 120 or the SLP 150 may modify the service (i.e., service parameters), for example (QoP, interval between fixes, etc.) (step G). The SET 120 or SLP 150 may also include position information (e.g. assistance data or a request for assistance data) in a positioning protocol message (PosPayload) in the SUPL MODIFY message (step G). The SET 120 and SLP 150 may engage in additional SUPL POS sessions exchanging position information and the SLP 150 may return position estimates to SET 120 in SUPL REPORT as applicable (steps H and I). The SLP 150 terminates the SUPL session (step Z).

Figure 12:
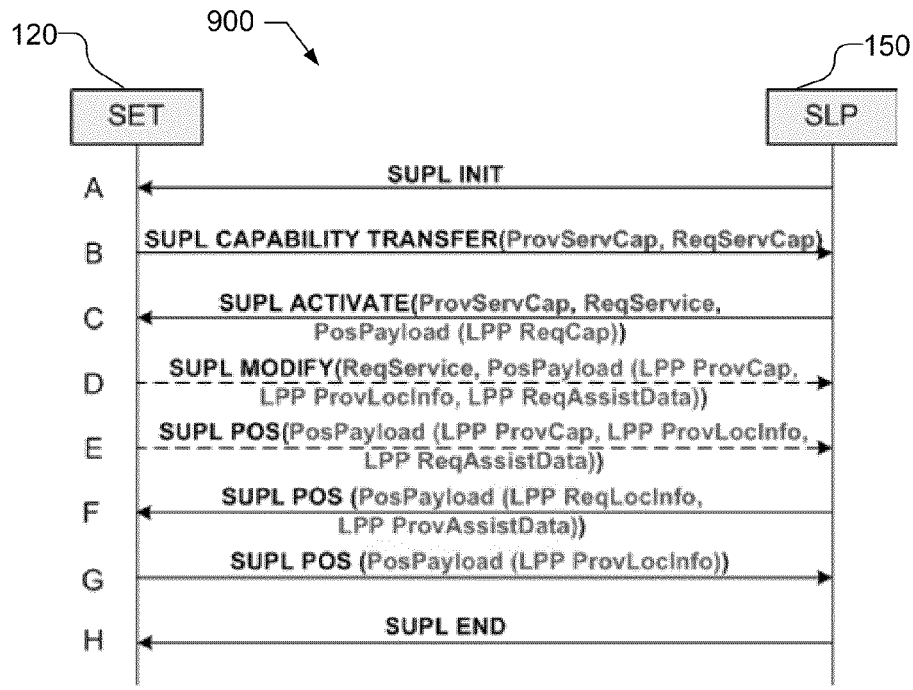
FIG. 12 shows an embodiment of a message flow for a network initiated single fix LPP service with SET assisted A-GNSS.

FIG. 12 shows an embodiment of a message flow 900 for a network initiated single fix service where the positioning protocol is LPP and the position method is SET assisted A-GNSS. SLP 150 starts a Network Initiated SUPL session with SET 120 by sending a SUPL NIT message to SET 120 (step A). The SET 120 establishes a secure IP connection to SLP 150 and then provides its service capabilities (ProvServCap) (i.e., the services it is willing and able to support) and requests the SLP's service capabilities (ReqServCap) in SUPL CAPABILITY TRANSFER (step B). The SUPL CAPABILITY TRANSFER in step B may include the positioning protocols supported by SET 120 which in this example will include LPP. In line with the service capabilities of SET 120, the SLP 150 selects and requests the service (ReqService), in this case a single immediate fix, in SUPL ACTIVATE (which activates the SUPL service). The SLP also provides its service capabilities (ProvServCap) and includes an LPP message that requests the SET's LPP positioning capabilities (LPP ReqCap) and may also include an LPP message that includes positioning information (PosPayload) such as assistance data (step C). The LPP message in step C corresponds to the LPP positioning protocol that SET 120 may have indicated it supports in step B. The SET 120 evaluates the service request and, depending on further information received about the service requested (e.g., SUPL Agent ID, etc.), may optionally modify the service (e.g., different QoP) and returns a modified service request (ReqService) with modified service parameters to the SLP in SUPL MODIFY (step D). The SET 120 may also include in the SUPL MODIFY message one or more LPP messages (PosPayload) that provide one or more of its LPP positioning capabilities (LPP ProvCap), location information containing location measurements (LPP ProvLocInfo) and a request for certain assistance data (LPP ReqAssistData). If step D is not executed, SET 120 may instead include one or more LPP messages containing one or more of its LPP positioning capabilities, some location measurements and a request for certain assistance data in a SUPL POS message (step E). The SLP 150 sends one or more LPP messages containing assistance data (LPP ProvAssistData) and/or a request for Location Information (LPP ReqLocInfo) in a SUPL POS message (step F). The SET 120 returns an LPP messages containing location information, in this case GNSS Pseudo Range measurements, (LPP ProvLocInfo) within a SUPL POS message to the SLP 150 and the SLP 150 calculates a position estimate (step G). The SLP 150 terminates the SUPL session (step H). Once the service has been activated at step C, the positioning layer (in this case LPP) can operate mostly independently of the service layer in steps E, F and G (or D, F and G if step D is performed). The positioning layer LPP messages and their transport within particular service layer messages can be different than show in this example. For example, positioning layer messages could be TIA-801 or LPP plus LPPe.

Figure 13:
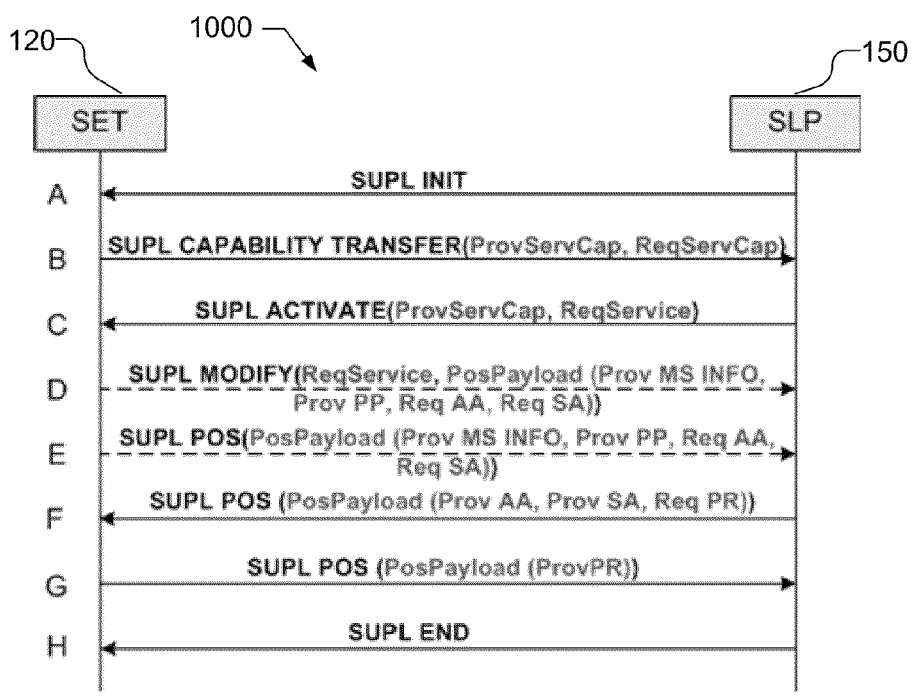
FIG. 13 shows an embodiment of a message flow for a network initiated single fix TIA-801 service with SET assisted A-GNSS.

FIG. 13 shows an embodiment of a message flow 1000 for a network initiated single fix TIA-801 service with SET assisted A-GNSS. SLP 150 starts a Network Initiated SUPL session with SET 120 by sending a SUPL INIT message to SET 120 (step A). The SET 120 establishes a secure IP connection to SLP 150 and then provides its service capabilities (ProvServCap) (i.e., the SUPL services it is willing and able to support) and requests the SLP's service capabilities (ReqServCap) in SUPL CAPABILITY TRANSFER (step B). The SUPL CAPABILITY TRANSFER in step B may also include the positioning protocols supported by SET 120 which in this example include TIA-801. In line with the service capabilities of SET 120, the SLP 150 selects and requests the service (ReqService), in this case a single immediate fix, in SUPL ACTIVATE (which activates the SUPL service). The SLP also provides its service capabilities (ProvServCap) and may include one or more TIA-801 positioning layer messages that request the SET's positioning capabilities (TIA-801 ReqCap) and/or provide positioning information (step C). The TIA-801 message in step C corresponds to the TIA-801 positioning protocol that SET 120 may have indicated it supports in step B. The SET 120 evaluates the service request and, depending on further information received about the service requested (e.g., SUPL Agent ID, etc.), may optionally modify the service (e.g., different QoP) and returns a modified service request (ReqService) with modified service parameters to the SLP in SUPL MODIFY (step D). The SET 120 includes within the SUPL MODIFY one or more positioning layer TIA-801 messages (PosPayload) containing the TIA-801 positioning capabilities of SET 120 (MS INFO), location information (Prov PP) and a request for GNSS acquisition assistance (Req AA) and sensitivity assistance (Req SA). If step D is not executed, the TIA-801 messages (PosPayload) described for step D may be provided instead in a SUPL POS message (step E). The SLP 150 returns one or more TIA-801 position layer messages (PosPayload) in a SUPL POS message containing GNSS acquisition assistance (Prov AA), sensitivity assistance (Prov SA) and a request for GNSS pseudo range information (Req PR) (step F). The SET 120 obtains the requested GNSS pseudo range measurements and returns a TIA-801 positioning layer message containing location information (in this case GNSS Pseudo Range measurements) to the SLP 150 (Prov PR) and the SLP 150 calculates a position estimate (step G). The SLP 150 terminates the SUPL session (step H). Once the service has been activated at step C, the positioning layer (in this case TIA-801) can operate mostly independently of the service layer in steps E, F and G (or D, F and G if step D is performed). The positioning layer TIA-801 messages and their transport within particular service layer messages can be different than show in this example.

Figure 14:
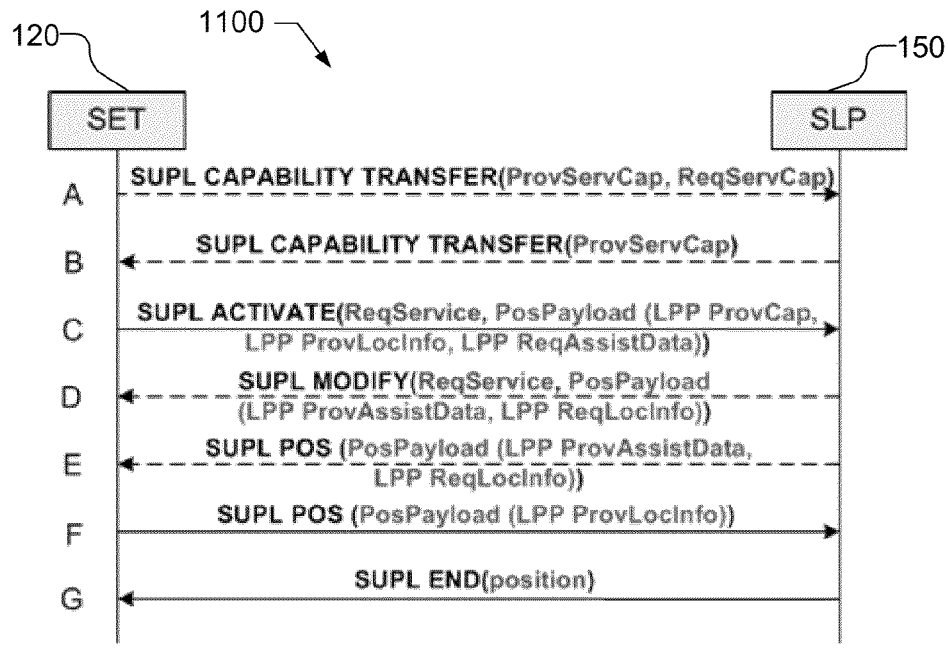
FIG. 14 shows an embodiment of a message flow for a SET initiated single fix LPP service with SET assisted A-GNSS.

FIG. 14 shows an embodiment of a message flow 1100 for a SET initiated single fix service where the positioning protocol is LPP and the position method is SET assisted A-GNSS. If the SET 120 does not already have the service capabilities of the SLP 150 (e.g. as obtained by SET 120 in a previous SUPL session), the SET 120 starts the SUPL session by establishing a secure IP connection to SLP 150 and then sending a SUPL CAPABILITY TRANSFER, providing its own service capabilities (ProvServCap) and requesting the SLP's service capabilities (ReqServCap) (step A). If step A was executed, the SLP 150 provides its service capabilities (ProvServCap) to the SET in SUPL CAPABILIITES TRANSFER (step B). The SUPL CAPABILITIES TRANSFER in step B may also include the positioning protocols supported by SLP 150 which in this example include LPP. The SET 120 activates the SUPL service, either after steps A and B are executed, or as the initial message if SET 120 already had the service capabilities of the SPL 150 by sending SUPL ACTIVATE (step C). The SET 120 selects and requests the service (ReqService) in line with the service capabilities of SLP 150, in this case single immediate fix, in SUPL ACTIVATE. The SET 120 may also include in the SUPL ACTIVATE message one or more LPP positioning layer messages (PosPayload) that provide one or more of its positioning capabilities (LPP ProvCap), location information containing location measurements (LPP ProvLocInfo) and a request for certain assistance data (LPP ReqAssistData) (step C). The LPP messages in step C correspond to the LPP positioning protocol that SLP 150 may have indicated it supports in step B. The SLP 150 evaluates the service request and, depending on further information received about the service requested (e.g., SUPL Agent ID, etc.), the SLP 150 may modify the service (e.g., different QoP) by returning a modified service request (ReqService) with modified service parameters to the SET 120 in SUPL MODIFY (step D). The SLP 150 may include in the SUPL MODIFY messages one or more LPP positioning layer messages (PosPayload) containing assistance data (LPP ProvAssistData) and/or a request for location information (LPP ReqLocInfo). If step D is not executed, SLP 150 may instead include one or more LPP messages (PosPayload) in a SUPL POS message containing assistance data (LPP ProvAssistData) and/or a request for location information (LPP ReqLocInfo) (step E). The SET 120 obtains the requested location information (in this case GNSS pseudo range measurements) and sends an LPP positioning layer message (PosPayload) in a SUPL POS message to SLP 150 containing this location information (LPP ProvLocInfo) and the SLP 150 calculates a position estimate (step F). The SLP 150 terminates the SUPL session and sends the position estimate (position) to SET 120 in a SUPL END (step G). Once the service has been activated at step C, the positioning layer (in this case LPP) can operate mostly independently of the service layer in steps E, and F (or D and F if step D is performed). The positioning layer LPP messages and their transport within particular service layer messages can be different than show in this example. For example, positioning layer messages could be TIA-801 or LPP plus LPPe.

Figure 15:
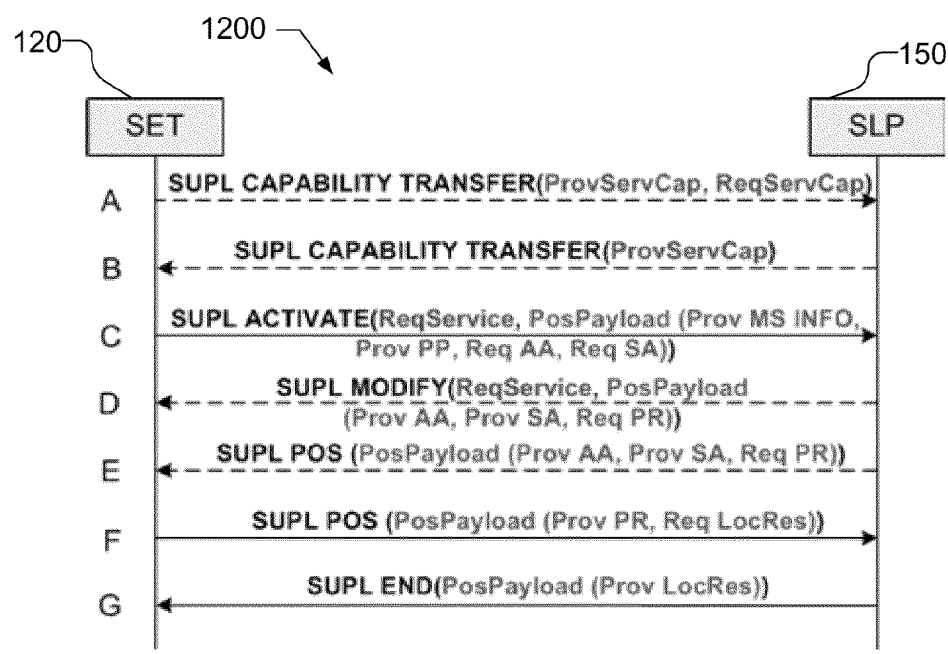
FIG. 15 shows an embodiment of a message flow for a SET initiated single fix TIA-801 service with SET assisted A-GNSS.

FIG. 15 shows an embodiment of a message flow 1200 for a SET initiated single fix service where the positioning protocol is TIA-801 and the position method is SET assisted A-GNSS. If the SET 120 does not already have the service capabilities of the SPL 150 (e.g. as obtained by SET 120 in a previous SUPL session), the SET 120 starts the SUPL session by establishing a secure IP connection to SLP 150 and then sending a SUPL CAPABILITY TRANSFER, providing its own service capabilities (ProvServCap) and requesting the SLP's service capabilities (ReqServCap) (step A). If step A was executed, the SLP 150 provides its service capabilities (ProvServCap) to the SET in SUPL CAPABILIITES TRANSFER (step B). The SUPL CAPABILITIES TRANSFER in step B may also include the positioning protocols supported by SLP 150 which in this example include TIA-801. The SET 120 activates the SUPL service, either after steps A and B are executed, or as the initial message if SET 120 already had the service capabilities of the SPL 150 by sending SUPL ACTIVATE (step C). The SET 120 selects and requests the service (ReqService) in line with the service capabilities of SLP 150, in this case single immediate fix, in SUPL ACTIVATE. The SET 120 may also include in the SUPL ACTIVATE message one or more TIA-801 positioning layer messages (PosPayload) that provide one or more of its positioning capabilities (Prov MS INFO), location information (Prov PP) and a request for acquisition assistance (Req AA) and sensitivity assistance (Req SA) (step C). The TIA-801 messages in step C correspond to the TIA-801 positioning protocol that SLP 150 may have indicated it supports in step B. The SLP 150 evaluates the service request and, depending on further information received about the service requested (e.g., SUPL Agent ID, etc.), the SLP 150 may modify the service (e.g., different QoP) by returning a modified service request (ReqService) with modified service parameters to the SET 120 in SUPL MODIFY (step D). The SLP 150 may include in the SUPL MODIFY messages one or more TIA-801 positioning layer messages (PosPayload), containing acquisition assistance (Prov AA), sensitivity assistance (Prov SA) and a request for pseudo range information (Req PR). If step D is not executed, SLP 150 may instead send a SUPL POS message containing the same TIA-801 messages (PosPayload) described in step D (step E). The SET 120 obtains the requested GNSS pseudo range measurements and sends one or more TIA-801 positioning layer messages (PosPayload) in a SUPL POS message to SLP 150 containing this location information (Prov PR) and a request for a location result (Req LocRes) (step F). The SLP 150 calculates a position estimate and sends it to SET 120 in TIA-801 message (Prov LocRes) inside a SUPL END to terminate the SUPL session (step G). Once the service has been activated at step C, the positioning layer (in this case TIA-801) can operate mostly independently of the service layer in steps E, and F (or D and F if step D is performed). The positioning layer TIA-801 messages and their transport within particular service layer messages can be different than shown in this example.

The SUPL service exemplified in FIGS. 7 to 15 differs from how services are supported in SUPL 2.0. There may be an advantage in aligning the SUPL service exemplified in FIGS. 7 to 15 with SUPL 2.0. For example, this may reduce the amount of software, firmware and hardware implementation necessary to support the SUPL service exemplified in FIGS. 7 to 15 when software, firmware and hardware is already available for SUPL 2.0. To help achieve this alignment, SUPL parameters that support services (e.g. SUPL immediate location, SUPL periodic location, SUPL triggered location) that appear the same to a SUPL Agent 112 or 170 in both the SUPL service exemplified in FIGS. 7 to 15 and SUPL 2.0 may be used without change in both versions of SUPL. Alternatively, these parameters may be defined and/or encoded differently in both versions of SUPL but may carry exactly the same information. As an example, SUPL parameters (such as a geographic area and a trigger condition of a SET entering, staying within or leaving the area) that convey the triggering conditions for a SUPL triggered service may be reused without change in both versions of SUPL or the information from these parameters may be retained without change although the parameters encoding this information may be different. In the former case, alignment would occur at the coding level whereas in the latter case the alignment would be at the information level.

Figure 16:
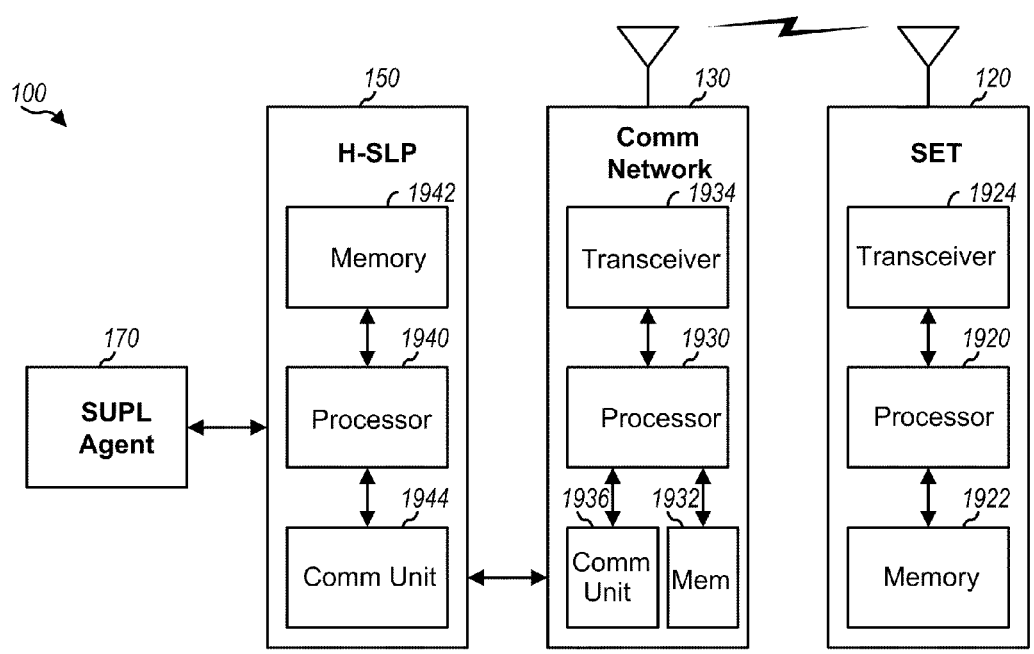
FIG. 16 shows a block diagram an embodiment of the SET, SLP, and communication network in network architectures illustrated in FIGS. 1 and 2.

FIG. 16 shows a block diagram an embodiment of SET 120, H-SLP 150, and communication network 130 in network architectures 100 and 102 in FIGS. 1 and 2. Communication network 130 provides communication for terminals and may include base stations (or Node Bs) and network controllers. For simplicity, FIG. 16 shows only one processor 1920, one memory unit 1922, and one transceiver 1924 for SET 120, only one processor 1930, one memory unit 1932, one transceiver 1934, and one communication (Comm) unit 1936 for network 130, and only one processor 1940, one memory unit 1942, and one transceiver 1944 for SLP 150. In general, each entity may include any number of processors, memory units, transceivers, communication units, controllers, and so on. SET 120 may support wireless communication and may also receive and process GPS signals.

On the downlink, base stations in network 130 transmit traffic data, signaling, and pilot to terminals within their coverage area. These various types of data are processed by processor 1930 and conditioned by transceiver 1934 to generate a downlink signal, which is transmitted via an antenna. At SET 120, the downlink signals from one or more base stations are received via an antenna, conditioned by transceiver 1924, and processed by processor 1920 to obtain various types of information for location services. For example, processor 1920 may decode messages used for the message flows described above. Memory units 1922 and 1932 store program codes and data for SET 120 and network 130, respectively. On the uplink, SET 120 may transmit traffic data, signaling, and pilot to one or more base stations in network 130. These various types of data are processed by processor 1920 and conditioned by transceiver 1924 to generate an uplink signal, which is transmitted via the SET antenna. At network 130, the uplink signals from SET 120 and other terminals are received and conditioned by transceiver 1934 and further processed by processor 1930 to obtain various types of information (e.g., data, signaling, reports, and so on). Network 130 communicates with SLP 150 and other network entities via communication unit 1936.

Within SLP 150, processor 1940 performs processing for the SLP, memory unit 1942 stores program codes and data for the SLP, and communication unit 1944 allows the SLP to communicate with network 130 and other network entities. Processor 1940 may perform processing for SLP 150 for the message flows described above.

The techniques described herein may be implemented by various means. For example, the techniques may be implemented in hardware, firmware, software, or a combination thereof. For a hardware implementation, the units used to perform the processing at each entity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. The software codes may be stored in a memory unit (e.g., memory unit 1922, 1932 or 1942 in FIG. 16) and executed by a processor (e.g., processor 1920, 1930 or 1940). The memory unit may be implemented within the processor or external to the processor. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. An apparatus comprising:
at least one processor configured to:
receive from a Secure User Plane Location (SUPL) agent a request for at least one position estimate for a SUPL enabled terminal (SET);
transmit to the SET a SUPL initial session message applicable to any service request;
receive from the SET service capabilities of the SET;
select and request service from the SET that is consistent with the service capabilities of the SET, wherein the service capabilities are different than positioning capabilities and wherein all service related parameters are provided in a different protocol layer than positioning related parameters with the exception of positioning protocol identification;
communicate with the SET to determine at least one position estimate for the SET; and
send the at least one position estimate to the SUPL agent.

2. The apparatus of claim 1, wherein no positioning parameters are provided prior to requesting service from the SET.

3. The apparatus of claim 1, wherein the at least one processor is configured to determine a position estimate for the SET for each of at least one reporting event.

4. The apparatus of claim 1, wherein the at least one processor is configured to provide service capabilities to the SET in response to receipt of the service capabilities of the SET.

5. The apparatus of claim 1, wherein the at least one processor is configured to receive from the SET a service modification request with service parameters that are modified with respect to the service requested from the SET.

6. The apparatus of claim 5, wherein the at least one processor is configured to receive from the SET the service modification request after requesting service from the SET but before communicating with the SET to determine the at least one position estimate for the SET.

7. The apparatus of claim 5, wherein the at least one processor is configured to receive from the SET the service modification request while communicating with the SET to determine the at least one position estimate for the SET.

8. The apparatus of claim 7, wherein the at least one processor is configured to:
communicate with the SET to determine a plurality of position estimates for the SET at a plurality of times ascertained by the SET; and
obtain the plurality of position estimates for the SET, wherein the service modification request is received between position estimates.

9. A method comprising:
receiving from a Secure User Plane Location (SUPL) agent a request for at least one position estimate for a SUPL enabled terminal (SET);
transmitting to the SET a SUPL initial session message applicable to any service request;
receiving from the SET service capabilities of the SET;
selecting and requesting service from the SET that is consistent with the service capabilities of the SET, wherein the service capabilities are different than positioning capabilities and wherein all service related parameters are provided in a different protocol layer than positioning related parameters with the exception of positioning protocol identification;
communicating with the SET to determine at least one position estimate for the SET; and sending the at least one position estimate to the SUPL agent.

10. The method of claim 9, wherein no positioning parameters are provided prior to requesting service from the SET.

11. The method of claim 9, further comprising determining a position estimate for the SET for each of at least one reporting event.

12. The method of claim 9, further comprising providing service capabilities to the SET in response to receipt of the service capabilities of the SET.

13. The method of claim 9, further comprising receiving from the SET a service modification request with service parameters that are modified with respect to the service requested from the SET.

14. The method of claim 13, wherein the service modification request is received after requesting service from the SET but before communicating with the SET to determine the at least one position estimate for the SET.

15. The method of claim 13, wherein the service modification request is received while communicating with the SET to determine the at least one position estimate for the SET.

16. The method of claim 15, further comprising:
communicating with the SET to determine a plurality of position estimates for the SET at a plurality of times ascertained by the SET; and
obtaining the plurality of position estimates for the SET, wherein the service modification request is received between position estimates.

17. A system comprising:
means for receiving from a Secure User Plane Location (SUPL) agent a request for at least one position estimate for a SUPL enabled terminal (SET);
means for transmitting to the SET a SUPL initial session message applicable to any service request;
means for receiving from the SET service capabilities of the SET;
means for selecting and requesting service from the SET that is consistent with the service capabilities of the SET, wherein the service capabilities are different than positioning capabilities and wherein all service related parameters are provided in a different protocol layer than positioning related parameters with the exception of positioning protocol identification;
means for communicating with the SET to determine at least one position estimate for the SET; and
means for sending the at least one position estimate to the SUPL agent.

18. The system of claim 17, wherein no positioning parameters are provided prior to requesting service from the SET.

19. The system of claim 17, further comprising means for receiving from the SET a service modification request with service parameters that are modified with respect to the service requested from the SET.

20. A computer-readable medium including program code stored thereon, comprising:
program code to receive from a Secure User Plane Location (SUPL) agent a request for at least one position estimate for a SUPL enabled terminal (SET);
program code to transmit to the SET a SUPL initial session message applicable to any service request;
program code to receive from the SET service capabilities of the SET;
program code to select and request service from the SET that is consistent with the service capabilities of the SET, wherein the service capabilities are different than positioning capabilities and wherein all service related parameters are provided in a different protocol layer than positioning related parameters with the exception of positioning protocol identification;
program code to communicate with the SET to determine at least one position estimate for the SET; and
program code to send the at least one position estimate to the SUPL agent.

21. The computer-readable medium of claim 20, wherein no positioning parameters are provided prior to requesting service from the SET.

22. The computer-readable medium of claim 20, further comprising program code to receive from the SET a service modification request with service parameters that are modified with respect to the service requested from the SET.

23. An apparatus comprising:
at least one processor configured to:
receive a request from a Secure User Plane Location (SUPL) agent for at least one position estimate for a SUPL enabled terminal (SET);
determine service capabilities of a SUPL Location Platform (SLP), wherein all service related parameters are provided in a different protocol layer than positioning related parameters with the exception of positioning protocol identification;
select and request service from the SLP that is consistent with the service capabilities of the SLP;
communicate with the SLP to determine at least one position estimate for the SET; and
communicate with the SLP to provide to the SUPL agent at least one position estimate for the SET.

24. The apparatus of claim 23, wherein no positioning parameters are provided prior to requesting service from the SLP.

25. The apparatus of claim 23, wherein the at least one processor is configured to:
request from the SLP the service capabilities of the SLP to start a SUPL session with the SLP;
receive from the SLP the service capabilities of the SLP to determine service capabilities of the SLP.

26. The apparatus of claim 25, wherein the at least one processor is configured to provide service capabilities of the SET to the SLP with the request from the SET for service capabilities of the SLP.

27. The apparatus of claim 23, wherein the at least one processor is configured to use information from a previous session with the SLP to determine service capabilities of the SLP.

28. The apparatus of claim 23, wherein the at least one processor is configured to receive from the SLP a service modification request with service parameters that are modified with respect to the service requested from the SLP.

29. The apparatus of claim 28, wherein the at least one processor is configured to receive from the SLP the service modification request after requesting service from the SLP but before communicate with the SLP to determine at least one position estimate for the SET.

30. The apparatus of claim 28, wherein the at least one processor is configured to receive from the SLP the service modification request while communicate with the SLP to determine at least one position estimate for the SET.

31. The apparatus of claim 30, wherein the at least one processor is configured to:
communicate with the SLP to determine a plurality of position estimates for the SET at a plurality of times ascertained by the SET; and communicate with the SLP to provide to the SUPL agent the plurality of position estimates for the SET, wherein the service modification request is received between position estimates.

32. A method comprising:
receiving a request from a Secure User Plane Location (SUPL) agent for at least one position estimate for a SUPL enabled terminal (SET),
determining service capabilities of a SUPL Location Platform (SLP), wherein all service related parameters are provided in a different protocol layer than positioning related parameters with the exception of positioning protocol identification;
selecting and requesting service from the SLP that is consistent with the service capabilities of the SLP;
communicating with the SLP to determine at least one position estimate for the SET; and
communicating with the SLP to provide to the SUPL agent at least one position estimate for the SET.

33. The method of claim 32, wherein no positioning parameters are provided prior to requesting service from the SLP.

34. The method of claim 32, wherein determining the service capabilities comprises:
requesting from the SLP the service capabilities of the SLP to start a SUPL session with the SLP;
receiving from the SLP the service capabilities of the SLP.

35. The method of claim 34, further comprising providing service capabilities of the SET to the SLP with the request from the SET for service capabilities of the SLP.

36. The method of claim 32, wherein the service capabilities are determined using information from a previous session with the SLP.

37. The method of claim 32, further comprising receiving from the SLP a service modification request with service parameters that are modified with respect to the service requested from the SLP.

38. The method of claim 37, wherein the service modification request is received after requesting service from the SLP but before communicating with the SLP to determine at least one position estimate for the SET.

39. The method of claim 37, wherein the service modification request is received while communicating with the SLP to determine at least one position estimate for the SET.

40. The method of claim 39, further comprising:
communicating with the SLP to determine a plurality of position estimates for the SET at a plurality of times ascertained by the SET; and
communicating with the SLP to provide to the SUPL agent the plurality of position estimates for the SET, wherein the service modification request is received between position estimates.

41. A system comprising:
means for receiving a request from a Secure User Plane Location (SUPL) agent for at least one position estimate for a SUPL enabled terminal (SET),
means for determining service capabilities of a SUPL Location Platform (SLP), wherein all service related parameters are provided in a different protocol layer than positioning related parameters with the exception of positioning protocol identification;
means for selecting and requesting service from the SLP that is consistent with the service capabilities of the SLP;
means for communicating with the SLP to determine at least one position estimate for the SET; and
means for communicating with the SLP to provide to the SUPL agent at least one position estimate for the SET.

42. The system of claim 41, wherein no positioning parameters are provided prior to requesting service from the SLP.

43. The system of claim 41, further comprising means for receiving from the SLP a service modification request with service parameters that are modified with respect to the service requested from the SLP.

44. A computer-readable medium including program code stored thereon, comprising:
program code to receive a request from a Secure User Plane Location (SUPL) agent for at least one position estimate for a SUPL enabled terminal (SET),
program code to determine service capabilities of a SUPL Location Platform (SLP), wherein all service related parameters are provided in a different protocol layer than positioning related parameters with the exception of positioning protocol identification;
program code to select and request service from the SLP that is consistent with the service capabilities of the SLP;
program code to communicate with the SLP to determine at least one position estimate for the SET; and
program code to communicate with the SLP to provide to the SUPL agent at least one position estimate for the SET.

45. The computer-readable medium of claim 44, wherein no positioning parameters are provided prior to requesting service from the SLP.

46. The computer-readable medium of claim 44, further comprising program code to receive from the SLP a service modification request with service parameters that are modified with respect to the service requested from the SLP.

47. A method comprising:
receiving from a Secure User Plane Location (SUPL) agent a request for at least one position estimate for a SUPL enabled terminal (SET);
transmitting User plane Location Protocol (ULP) service layer messages between the SET and a SUPL Location Platform (SLP), wherein the ULP service layer messages do not contain any parameters directly related to positioning;
transmitting ULP positioning layer messages between the SET and the SLP, wherein the ULP positioning layer messages do not contain any service parameters, wherein all service related parameters are provided in a different protocol layer than positioning related parameters with the exception of positioning protocol identification; and
determining at least one position estimate for the SET.

* * * * *